(12) United States Patent
Wang

(10) Patent No.: US 12,467,570 B2
(45) Date of Patent: Nov. 11, 2025

(54) FLUID JOINT STRUCTURE

(71) Applicant: FIVEGRAND INTERNATIONAL CO., LTD., New Taipei (TW)

(72) Inventor: Ting-Jui Wang, New Taipei (TW)

(73) Assignee: FIVEGRAND INTERNATIONAL CO., LTD., New Taipei (TW)

( * ) Notice: Subject to any disclaimer, the term of this patent is extended or adjusted under 35 U.S.C. 154(b) by 144 days.

(21) Appl. No.: 18/120,429

(22) Filed: Mar. 13, 2023

(65) Prior Publication Data

US 2023/0288004 A1  Sep. 14, 2023

(30) Foreign Application Priority Data

Mar. 14, 2022  (TW) ................... 111109179

(51) Int. Cl.
*F16L 37/36* (2006.01)

(52) U.S. Cl.
CPC .................... *F16L 37/36* (2013.01)

(58) Field of Classification Search
CPC ............ F16L 37/36; F16L 37/32; F16L 29/04
See application file for complete search history.

(56) References Cited

U.S. PATENT DOCUMENTS

| | | | | | |
|---|---|---|---|---|---|
| 5,339,862 | A | * | 8/1994 | Haunhorst | F16L 37/36 251/264 |
| 5,404,909 | A | * | 4/1995 | Hanson | F16L 55/1007 62/50.7 |
| 5,415,200 | A | * | 5/1995 | Haunhorst | F16L 37/36 251/264 |
| 6,161,579 | A | * | 12/2000 | Vulliet | F16L 37/32 137/614.04 |
| 2006/0196562 | A1 | * | 9/2006 | Curello | F16K 15/063 137/614.04 |
| 2013/0019973 | A1 | * | 1/2013 | Gose | F16L 37/32 285/332.2 |
| 2013/0125989 | A1 | * | 5/2013 | Clever | F16L 37/40 137/68.14 |
| 2017/0138522 | A1 | * | 5/2017 | Foner | F16L 55/07 |
| 2019/0383433 | A1 | * | 12/2019 | Tiberghien | F16L 37/40 |

FOREIGN PATENT DOCUMENTS

| | | | | |
|---|---|---|---|---|
| CN | 107250645 A | * | 10/2017 | .......... B67D 7/3218 |
| CN | 113566039 A | | 10/2021 | |
| JP | 2019002544 A | | 1/2019 | |
| TW | 201137266 A | | 11/2011 | |

OTHER PUBLICATIONS

CN-107250645-A Translation; 2017.*

* cited by examiner

*Primary Examiner* — Marina A Tietjen

(57) ABSTRACT

The present disclosure provides a fluid joint structure including a first body and a second body. The first body includes a first cavity, a first joint element and a first elastic element. The second body includes a second cavity, a second joint element and a second elastic element. The first body is joined with the second body such that the first joint element and the second joint element push against each other to generate a flow path of a fluid for the fluid to flow in the first cavity and the second cavity. Thus, a required fluid is enabled to flow stably in the first body and the second body.

3 Claims, 22 Drawing Sheets

126(226)

FLUID JOINT STRUCTURE

CROSS-REFERENCE TO RELATED APPLICATION

This non-provisional application claims priority under 35 U.S.C. § 119(a) on Patent Application No(s). 111109179 filed in Taiwan, R.O.C. on Mar. 14, 2022, the entire contents of which are hereby incorporated by reference.

BACKGROUND OF THE INVENTION

1. Field of the Invention

The present disclosure relates to a fluid joint structure, and in particular to a fluid joint structure enabling a required fluid to flow stably.

2. Description of the Related Art

In common fluid transportation, a valve is provided according to requirements at a pipeline of the fluid to serve as a switch for the fluid transportation.

However, a gap is usually caused in such conventional valve after use for an extended period of time, resulting in loss of the function of the valve and hence failure of stable transportation of the fluid in the pipeline.

BRIEF SUMMARY OF THE INVENTION

In view of the prior art above, the applicant has developed a fluid joint structure in the aim of achieving an object of enabling a required fluid to flow stably.

To achieve the above and other objects, the present disclosure provides a fluid joint structure including a first body and a second body. The first body includes a first cavity, the first cavity is movably provided with a first joint element, a first elastic element is provided between the first cavity and the first joint element, and the first joint element is configured to stop a fluid in the first cavity. The second body includes a second cavity, the second cavity is movably provided with a second joint element, a second elastic element is provided between the second cavity and the second joint element, and the second joint element is configured to stop a fluid in the second cavity. The first joint element and the second joint element push against each other to generate a flow path of the fluid for the fluid to flow in the first cavity and the second cavity.

The present disclosure further provides a fluid joint structure including a first body, a second body and a motion unit. The first body includes a first cavity, the first cavity is movably provided with a first joint element, a first elastic element is provided between the first cavity and the first joint element, and the first joint element is configured to stop a fluid in the first cavity. The second body includes a second cavity, the second cavity is movably provided with a second joint element, a second elastic element is provided between the second cavity and the second joint element, and the second joint element is configured to stop a fluid in the second cavity. The motion unit is movably assembled at the first body and pushes against the first joint element, such that the first joint element pushes against the second joint element to generate a flow path of the fluid for the fluid to flow in the first cavity and the second cavity.

The present disclosure further provides a fluid joint structure including a first body, a second body and a motion unit. The first body includes a first cavity, the first cavity is movably provided with a first joint element, and the first joint element is configured to stop a fluid in the first cavity. The second body includes a second cavity, the second cavity is movably provided with a second joint element, a second elastic element is provided between the second cavity and the second joint element, and the second joint element is configured to stop a fluid in the second cavity. The motion unit is movably assembled at the first body, and the motion unit and the first joint element push against the second joint element to generate a flow path of the fluid.

The present disclosure further provides a joint method for a fluid joint structure. The method includes joining a first body with a second body, such that a first joint element and a second joint element push against each other to generate a flow path of a fluid for the fluid to flow in a first cavity and a second cavity.

The present disclosure further provides a joint method for a fluid joint structure. The method includes joining a first body with a second body and pushing against a first joint element by a motion unit, such that the first joint element pushes against a second joint element to generate a flow path of a fluid for the fluid to flow in a first cavity and a second cavity.

In the above fluid joint structure, one end of the first elastic element pushes against the first joint element and the other end of the first elastic element pushes against one side of the first body, such that the first joint element normally leans against the other side of the first body and corresponds to the second joint element so as to stop the fluid flowing through the first cavity.

In the above fluid joint structure, one end of the second elastic element pushes against the second joint element and the other end of the second elastic element pushes against one side of the second body, such that the second joint element normally leans against the other side of the second body and corresponds to the first joint element so as to stop the fluid flowing through the second cavity.

In the above fluid joint structure, the elastic force of the first elastic element is equal to or similar to the elastic force of the second elastic element, such that the first joint element and the second joint element push against each other to recede simultaneously to generate the flow path of the fluid, for the fluid to flow in the first cavity and the second cavity.

In the above fluid joint structure, the elastic force of the first elastic element is greater than the elastic force of the second elastic element, such that the first joint element coordinates with the first elastic element to push against the second joint element and the second elastic element to recede. Once the second joint element pushes against the second body, the second joint element pushes against the first joint element to recede so as to generate the flow path of the fluid, for the fluid to flow in the first cavity and the second cavity.

In the above fluid joint structure, the elastic force of the first elastic element is greater than the elastic force of the second elastic element, such that the first joint element coordinates with the first elastic element to push against the second joint element and the second elastic element to recede. Alternatively, when the second elastic element cannot recede further, or the structure of the second elastic element cannot recede further, or the second elastic element is compressed to an extent of no remaining elastic space, or the second elastic element is compressed to be in an overlapping state, the second joint element pushes against the first joint element to recede so as to generate the flow path of a fluid.

In the above fluid joint structure, the elastic force of the second elastic element is greater than the elastic force of the first elastic element, such that the second joint element coordinates with the second elastic element to push against the first joint element and the first elastic element to recede. Once the first joint element pushes against the first body, the first joint element pushes against the second joint element to recede so as to generate the flow path of the fluid, for the fluid to flow in the second cavity and the first cavity.

In the above fluid joint structure, the elastic force of the second elastic element is greater than the elastic force of the first elastic element, such that the second joint element coordinates with the second elastic element to push against the first joint element and the first elastic element to recede. Alternatively, when the first elastic element cannot recede further, or the structure of the first elastic element cannot recede further, or the first elastic element is compressed to an extent of no remaining elastic space, or the first elastic element is compressed to be in an overlapping state, the first joint element pushes against the second joint element to recede so as to generate the flow path of the fluid.

In the above fluid joint structure, a fluid barrier or a flow absorber is provided between the first body and the second body. The flow barrier or the flow absorber is compressed or is not compressed when the first body is joined with the second body, and the flow barrier or the flow absorber is configured to be adjacent to or close to the first joint element and the second joint element, so as to stop, guide or absorb the fluid.

In the above fluid joint structure, the first body has a first coupling portion, the second body has a second coupling portion, and the length, thickness or width of the second elastic element is smaller than, greater than or equal to that of the first elastic element, such that the first joint element coordinates with the first elastic element to push against the second joint element and the second elastic element to recede. Once the first coupling portion and the second coupling portion come into contact with each other, the second joint element pushes against the first joint element to recede so as to generate the flow path of the fluid, for the fluid to flow in the first cavity and the second cavity.

In the above fluid joint structure, the first body has a first coupling portion, the second body has a second coupling portion, and the length, thickness or width of the first elastic element is smaller than, greater than or equal to that of the second elastic element, such that the second joint element coordinates with the second elastic element to push against the first joint element and the first elastic element to recede. Once the first coupling portion and the second coupling portion come into contact with each other, the first joint element pushes against the second joint element to recede so as to generate the flow path of the fluid, for the fluid to flow in the second cavity and the first cavity.

In the above fluid joint structure, the first body has a connecting portion, the second body has a corresponding connecting portion, and the connecting portion is joined with the corresponding connecting portion.

In the above fluid joint structure, the first joint element has a first joint portion and at least a first flow path, the second joint element has a second joint portion and at least one second flow path, and the first joint portion and the second joint portion push against each other for the fluid to flow in the first flow path and the second flow path.

In the above fluid joint structure, the first joint element has at least one first flow path, the second joint element has at least one second flow path, and the first flow path and the second flow path are grooves, recesses, pipes, protrusions, holes or steps.

In the above fluid joint structure, the first joint element has a first block portion, the second joint element has a second block portion, the first block portion blocks the first body, and the second block portion blocks the second body.

In the above fluid joint structure, the first body and the second body are lockingly assembled.

In the above fluid joint structure, the first joint element is provided with an alignment portion, the second joint element is provided with a corresponding alignment portion, and the alignment portion and the corresponding alignment portion are configured for mutual alignment, limiting, anti-rotation, guiding alignment or guiding limiting.

In the above fluid joint structure, the first body is provided with a first joint portion, the second body is provided with a second joint portion, the first joint portion is in communication with the first cavity, the second joint portion is in communication with the second cavity, and the first joint portion and the second joint portion are joined with each other.

In the above fluid joint structure, the first body is provided with a fastened portion, the second body is provided with a fastening portion, and the fastened portion and the fastening portion are fastened with each other.

In the above fluid joint structure, the motion unit is located on one side of the first body, one end of the first elastic element pushes against the first joint element and the other end of the first elastic element pushes against the other side of the first body, such that the first joint element normally leans against the motion unit and corresponds to the second joint element so as to stop the fluid flowing through the first cavity.

In the above fluid joint structure, one end of the second elastic element pushes against the second joint element and the other end of the second elastic element pushes against one side of the second body, such that the second joint element normally leans against the other side of the second body and corresponds to the first joint element so as to stop the fluid flowing through the second cavity.

In the above fluid joint structure, a third elastic element is provided between the motion unit and the first body.

In the above fluid joint structure, the motion unit has an operating portion, and the operating portion controls the first joint element.

In the above fluid joint structure, the motion unit is provided with a fastened portion, the second body is provided with a fastening portion, and the fastened portion and the fastening portion are fastened with each other.

In the above fluid joint structure, the first joint element has a corresponding anti-rotation portion, the second joint element has an anti-rotation portion, and the corresponding anti-rotation portion and the anti-rotation portion are configured for mutual anti-rotation so as to increase flow.

In the above fluid joint structure, the first joint element has a corresponding anti-rotation portion and a first pushing portion, the second joint element has an anti-rotation portion and a second pushing portion, and the corresponding anti-rotation portion and the anti-rotation portion are configured for mutual anti-rotation to have the first pushing portion and the second pushing portion correspond to each other so as to increase flow.

In the above fluid joint structure, the corresponding anti-rotation portion or the anti-rotation portion is a triangular, tetragonal, pentagonal, hexagonal, ellipsoidal, convex, concave, groove, polygonal or rectangular body.

In the above fluid joint structure, the second joint element has a guide portion or the first joint element has a corresponding guide portion, and the guide portion and the corresponding guide portion are configured for guiding the assembly.

In the above fluid joint structure, the guide portion or the corresponding guide portion is an inclined surface, a curved surface, an arc surface, a step, a protrusion or a recess.

In the above fluid joint structure, the first joint element or the second joint element has a stop portion, the second cavity or the first cavity has a corresponding stop portion, and the stop portion and the corresponding stop portion are configured for corresponding anti-rotation.

In the above fluid joint structure, when the first joint element and the second joint element come into contact with each other and push against each other to generate an outflowing fluid, the fluid is located at the first body and the second body or an anti-leak range of the first cavity and the second cavity, so as to prevent leakage of the fluid.

In the above fluid joint structure, the first body and the second body are joined with each other, such that the first body and the second body or the first cavity and the second cavity are leak-proof, and the first joint element and the second joint element come into contact with each other and push against each other to generate an outflowing fluid, so as to prevent leakage of the fluid.

In the above fluid joint structure, when the first body or the second body is separated or assembled, the flow absorber absorbs the fluid before the first joint element or the second joint element is not closed.

In the above fluid joint structure, the flow barrier or the flow absorber is an elastic body, a liquid absorbing body, a glue body or a sponge body.

In the above fluid joint structure, the flow barrier or the flow absorber is arranged by means of engaging, adhesion, locking or fitting.

In the above fluid joint structure, the flow barrier or the flow absorber is a flow barrier structure or a flow absorber structure protruding or recessed between the first body and the second body.

In the above fluid joint structure, the flow barrier is an O ring, a water stop ring, a rubber ring or a washer.

In the above fluid joint structure, the first elastic element and the second elastic element are springs or elastic bodies.

In the fluid joint structure above, the fluid is a liquid or a gas.

In the above fluid joint structure, the elastic force of the first elastic element is greater than the elastic force of the second elastic element, or a travel stroke of the first elastic element is smaller than, greater than, equal to or similar to that of the second elastic element. When the first body and the second body are separated, the first joint element first closes the first cavity and then the second joint element closes the second cavity.

In the above fluid joint structure, when the first body and the second body are separated, the first joint element first closes the first cavity and then the second joint element closes the second cavity, or the second joint element first closes the second cavity and then the first joint element closes the first cavity.

In the above fluid joint structure, the elastic force of the first elastic element is greater than the elastic force of the second elastic element, or the elastic force of the second elastic element is greater than that of the first elastic element, or a travel stroke of the first elastic element is smaller than, greater than, equal to or similar to that of the second elastic element, and the fluid flows from the first body toward the second body. When the first body and the second body are separated, the first joint element first closes the first cavity, the fluid residing between the first body and the second body flows into the second cavity due to the elastic force, the pressure of the fluid, the pressure of the flow direction, the inertia, the attraction or the gravity, and then the second joint element closes the second cavity.

In the above fluid joint structure, the elastic force of the first elastic element is greater than the elastic force of the second elastic element, or a travel stroke of the first elastic element is smaller than, greater than, equal to or similar to that of the second elastic element, and the fluid flows from the first body toward the second body. When the first body and the second body are separated, the first joint element first closes first cavity, the fluid residing between the first body and the second body flows into the second cavity due to the elastic force of the first elastic element, or the force of fluid flowing from the first cavity to the second cavity, or the pressure or inertia of the fluid flowing from the first cavity to the second cavity, and then the second joint element closes the second cavity.

In the above fluid joint structure, when the first body and the second body are separated, the first joint element first closes the first cavity, the fluid residing between the first body and the second body flows into the second cavity due to the elastic force, the pressure of the fluid, the pressure of the flow direction or the inertia, and then the second joint element closes the second cavity.

In the above fluid joint structure, the first joint element and the motion unit are a multi-piece structure, or the first joint element and the motion unit are an integrally formed structure.

Thus, the fluid joint structure of the present disclosure is capable of enabling a required fluid to flow stably in the first body and the second body.

DETAILED DESCRIPTION OF THE INVENTION

To facilitate understanding of the object, characteristics and effects of the present disclosure, embodiments together with the attached drawings for the detailed description of the present disclosure are provided below.

Figure 1:
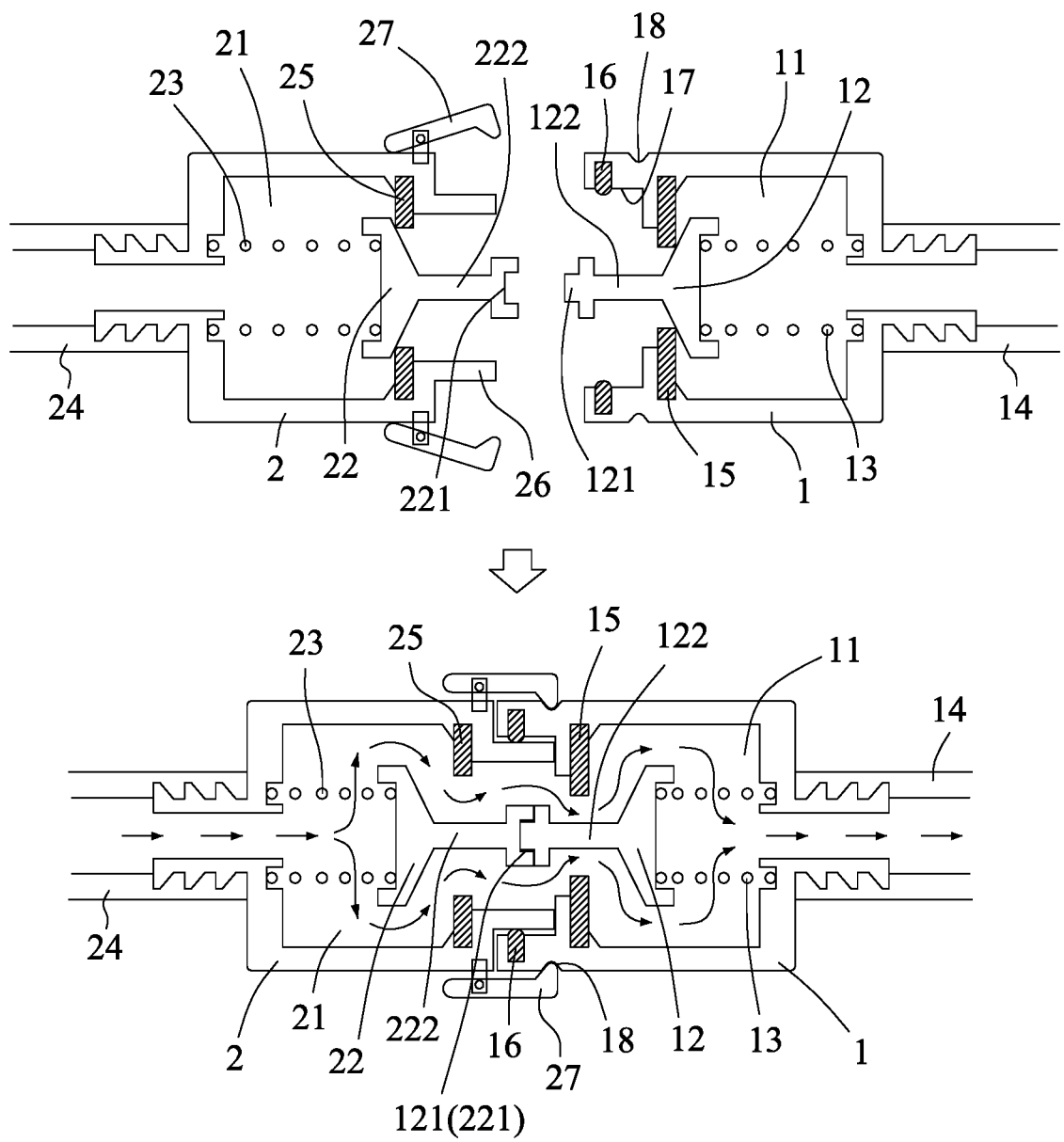
FIG. 1 is a schematic diagram of a state of use of a fluid joint structure according to a first embodiment of the present disclosure.

Refer to FIG. 1 showing a fluid joint structure of the present disclosure. The fluid joint structure includes a first body 1 and a second body 2. The first body 1 and the second body 2 may be ring-shaped. The fluid joint structure of the present disclosure is applicable to engineering pipelines, heat dissipation pipelines of servers or heat dissipation pipelines of data centers.

The first body 1 includes a first cavity 11. The first cavity 11 is movably provided with a first joint element 12. A first elastic element 13 is provided between the first cavity 11 and the first joint element 12. The first joint element 12 is configured to stop a fluid in the first cavity 11.

The second body 2 includes a second cavity 21. The second cavity 21 is movably provided with a second joint element 22. A second elastic element 23 is provided between the second cavity 21 and the second joint element 22. The second joint element 22 is configured to stop a fluid in the second cavity 21. The first body 1 is joined with the second body 2, such that the first joint element 12 and the second joint element 22 push against each other to generate a flow path of the fluid, for the fluid to flow in the first cavity 11 and the second cavity 21 (wherein the fluid is a liquid or a gas).

In a joint method of the fluid joint structure of the present disclosure, the first body 1 and the second body 2 may be correspondingly joined, such that the first joint element 12 and the second joint element 22 push against each other to further generate a flow path of the fluid in the first cavity 11 and the second cavity 21, for the fluid to flow in the first cavity 11 and the second cavity 21. For example, the fluid is enabled to flow in a direction from the second cavity 21 to the first cavity 11, or to flow in a direction from the first cavity 11 to the second cavity 21, so that a required fluid is enabled to flow stably in the first body 1 and the second body 2.

In one embodiment of the present disclosure, one end of the first elastic element 13 pushes against the first joint element 12 and the other end of the first elastic element 13 pushes against one side of the first body 1, such that the first joint element 12 normally leans against the other side of the first body 1 and corresponds to the second joint element 22, so as to stop the fluid flowing through the first cavity 11. One end of the second elastic element 23 pushes against the second joint element 22 and the other end of the second elastic element 23 pushes against one side of the second body 2, such that the second joint element 22 normally leans against the other side of the second body 2 and corresponds to the first joint element 12, so as to stop the fluid flowing through the second cavity 21. Moreover, in this embodiment, the elastic force of the first elastic element 13 is equal to (or similar to) the elastic force of the second elastic element 23, such that the first joint element 12 and the second joint element 22 push against each other to recede simultaneously so as to generate the flow path of the fluid, for the fluid to flow in the first cavity 11 and the second cavity 21.

On the basis of the above embodiment, when the fluid enters a pipe 24 of the second body 2, the second elastic element 23 may coordinate with the second joint element 22 to stop the fluid entering the second cavity 21. Once the first joint element 12 and the second joint element 22 butt and push against each other, the first joint element 12 and the second joint element 23 are enabled to recede simultaneously to compress the first elastic element 13 by the first joint element 12 and compress the second elastic element 23 by the second joint element 22, such that the first joint element 12 and the second joint element 22 push against each other and then generate the flow path of the fluid, for the fluid to flow in the first cavity 11 and the second cavity 21. Thus, the fluid enters the pipe 24 of the second body 2 and flows through the second cavity 21 to the first cavity 11, and then is guided by a pipe 14 of the first body 1 to a required position or apparatus, further enabling the required fluid to flow stably in the first body 1 and the second body 2.

In one embodiment of the present disclosure, a first stop ring 15 is provided between the first joint element 12 and the first body 1, a second stop ring 25 is provided between the second joint element 22 and the second body 2, and a third stop ring 16 is provided between the first body 1 and the second body 2. With the coordination of the first stop ring 15, the second stop ring 25 and the third stop ring 16, the fluid is prevented from leaking from the first body 1 and the second body 2, thus enabling the fluid to flow stably in the first body 1 and the second body 2.

In one embodiment of the present disclosure, the first joint element 12 is provided with an alignment portion 121, and the second joint element 22 is provided with a corresponding alignment portion 221. The alignment portion 121 and the corresponding alignment portion 221 are configured for mutual alignment, limiting, anti-rotation, guiding alignment or guiding limiting. The first body 1 is provided with a first joint portion 17, and the second body 2 is provided with a second joint portion 26. The first joint portion 17 is in communication with the first cavity 11, and the second joint portion 26 is in communication with the second cavity 21. As such, the first joint portion 17 of the first body 1 and the second joint portion 26 of the second body 2 are enabled to join with each other, so that once the alignment portion 121 of the first joint element 12 and the corresponding alignment portion 221 of the second joint element 22 butt and push against each other, the first joint element 12 and the second joint element 22 are enabled to recede simultaneously to compress the first elastic element 13 by the first joint element 12 and compress the second elastic element 23 by the second joint element 22, such that the first joint element 12 and the second joint element 22 push against each other and then generate the flow path of the fluid, for the fluid to flow in the first cavity 11 and the second cavity 21. Thus, the fluid enters the pipe 24 of the second body 2 and flows through the second cavity 21 to the first cavity 11, and then is guided by the pipe 14 of the first body 1 to a required position or apparatus, further enabling the required fluid to flow stably in the first body 1 and the second body 2.

In one embodiment of the present disclosure, the first body 1 has a fastened portion 18, the second body 2 has a fastening portion 27, and the fastened portion 18 and the fastening portion 27 are fastened with each other. In this embodiment, the fastened portion 18 is a groove, and the fastening portion 27 is a fastener. As such, the first joint portion 17 of the first body 1 and the second joint portion 26 of the second body 2 are enabled to be joined with each other, and be fastened with each other by the fastened portion 18 and the fastening portion 27, thereby securely coupling the first body 1 and the second body 2 to further enable the fluid to flow stably in the first body 1 and the second body 2.

In one embodiment of the present disclosure, the first joint element 12 has a first neck 122, and the second joint element 22 has a second neck 222. As such, the distance by which the first joint element 12 and the second joint element 22 push against each other can be increased to adjust a travel stroke of the movement of the first joint element 12 and the second joint element 22.

In one embodiment of the present disclosure, the first elastic element 13 and the second elastic element 23 are springs or elastic bodies, thereby meeting actual application requirements.

In one embodiment of the present disclosure, when the first joint element 12 and the second joint element 22 come into contact with each other and push against each other to generate an outflowing fluid, the fluid is located at the first body 1 and the second body 2 or an anti-leak range of the first cavity 11 and the second cavity 21, so as to prevent leakage of the fluid to thereby meet actual application requirements.

In one embodiment of the present disclosure, the first body 1 and the second body 2 are joined with each other, such that the first body 1 and the second body 2 or the first cavity 11 and the second cavity 21 are leak-proof, and the first joint element 12 and the second joint element 22 come into contact with each other and push against each other to generate the outflowing fluid, so as to prevent leakage of the fluid to thereby meet actual application requirements.

Figure 2:
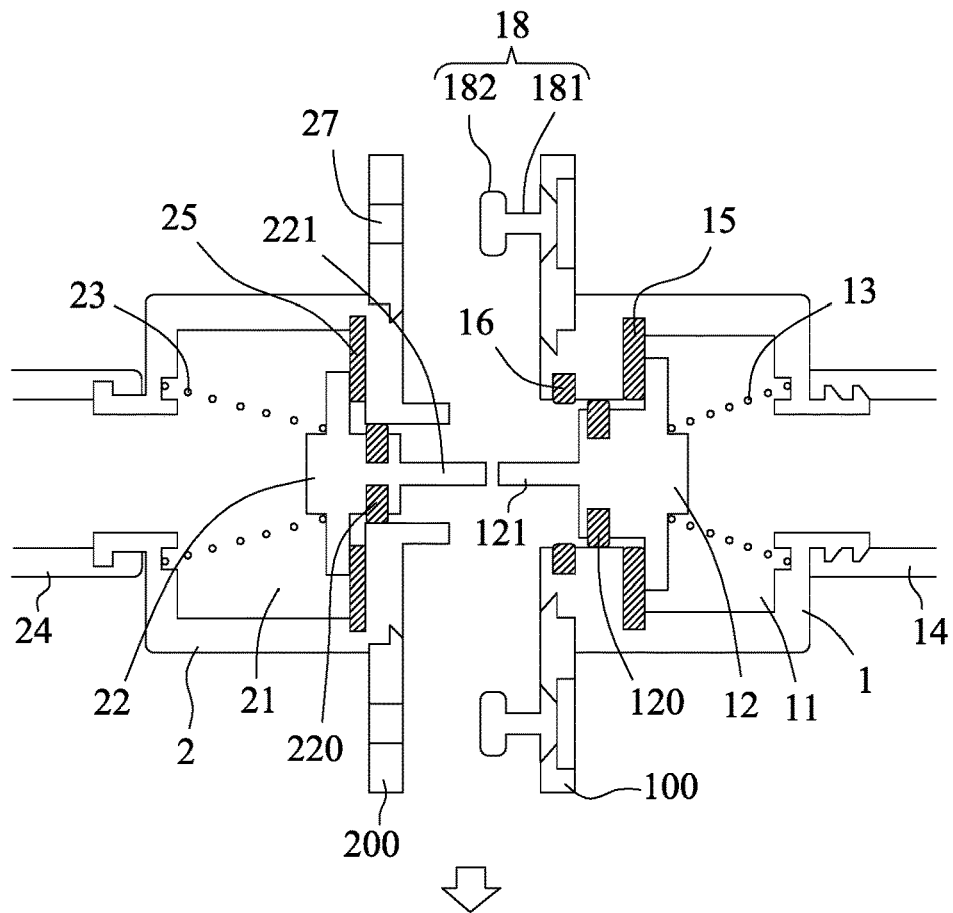
FIG. 2 is a schematic diagram of a state of use of a fluid joint structure according to a second embodiment of the present disclosure.
Figure 2:
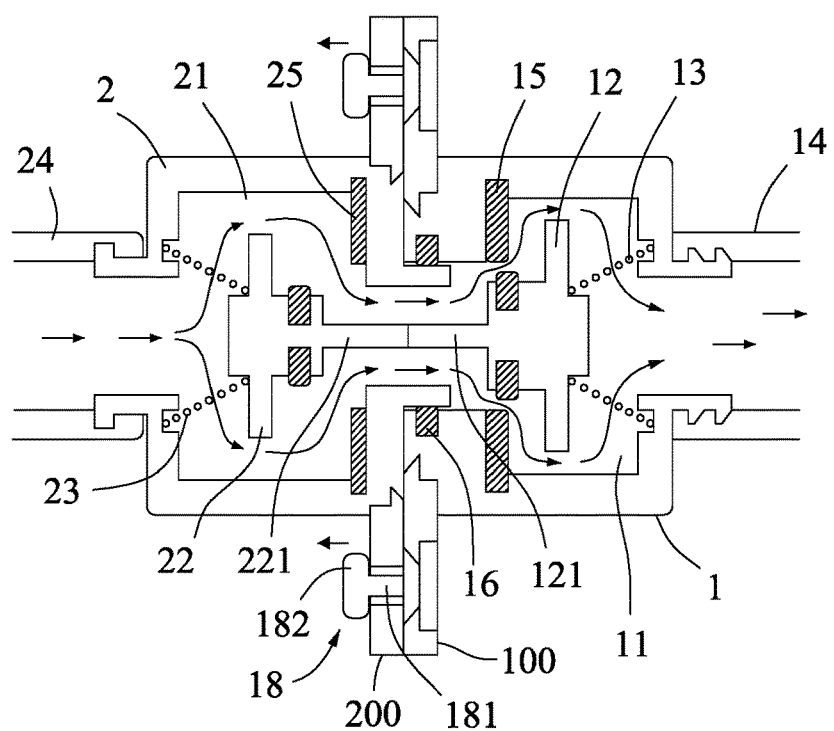
Figure 3:
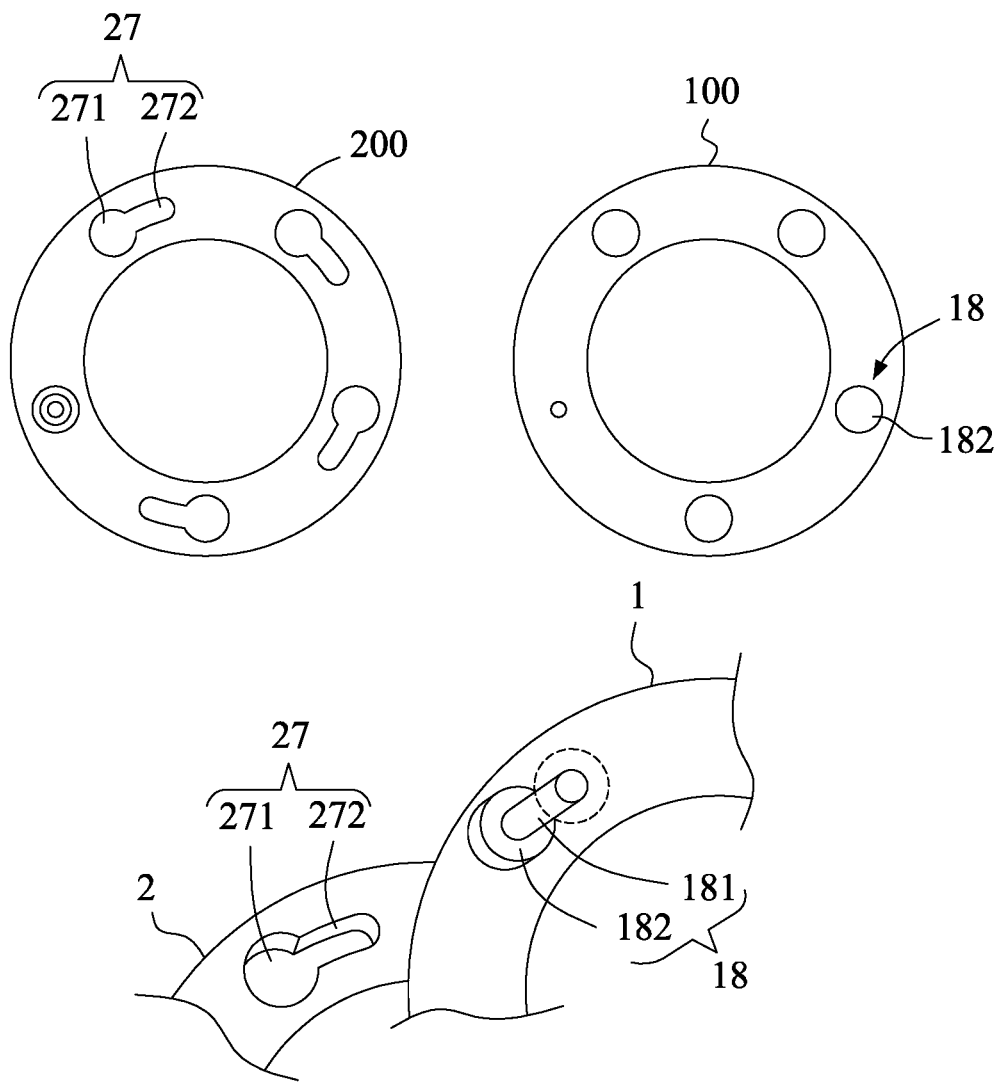
FIG. 3 is a first schematic diagram of a first body and a second body of the present disclosure in an assembled state.
Figure 4:
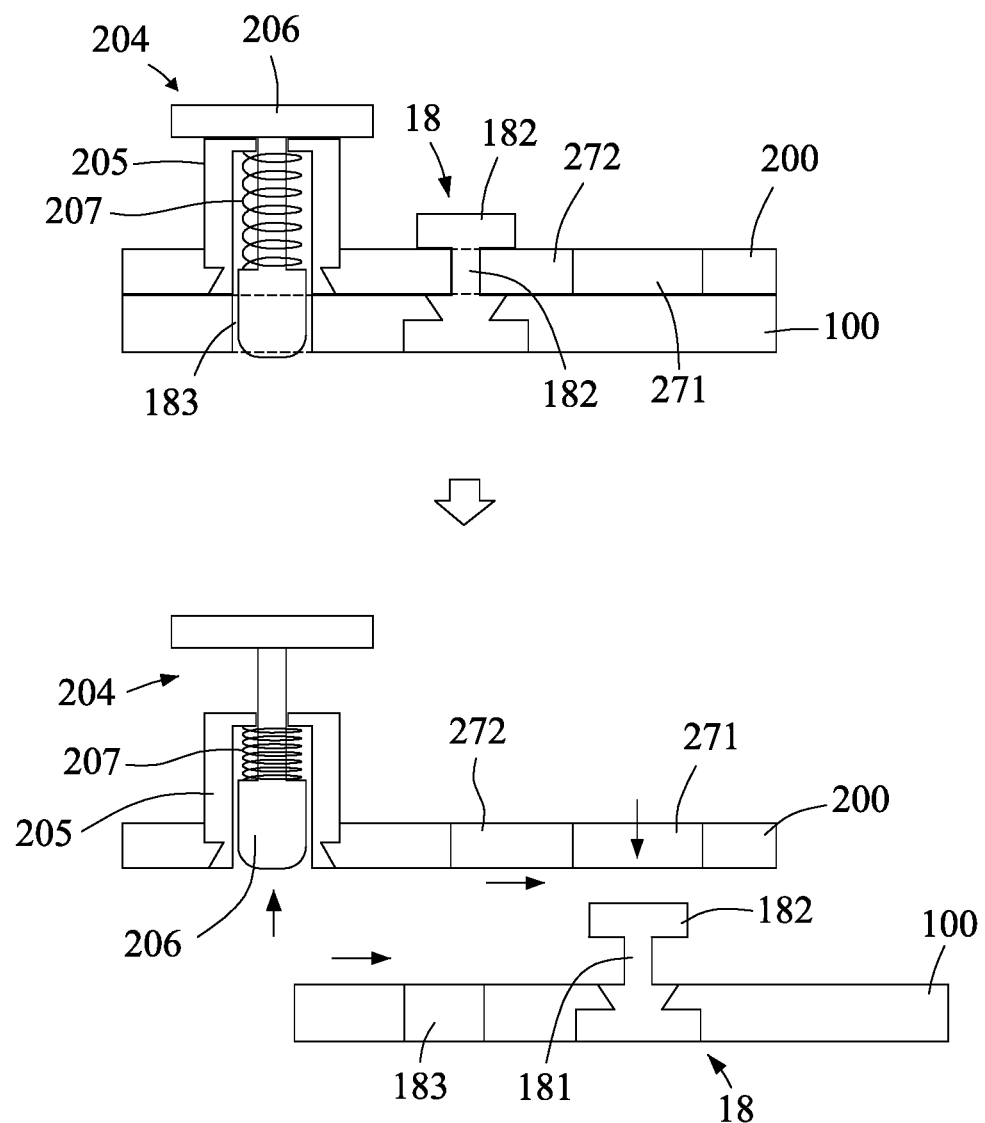
FIG. 4 is a second schematic diagram of a first body and a second body of the present disclosure in an assembled state.

Referring to FIG. 2 to FIG. 4, in one embodiment of the present disclosure, different from the above embodiments, the first body 1 has a first assembly member 100 at which the fastened portion 18 may be disposed, and the second body 2 has a second assembly member 200 at which the fastening portion 27 may be disposed. The fastened portion 18 has a neck 181 and a head 182, wherein the head 182 is disposed at one end of the neck 181. The fastening portion 27 has an entry portion 271 and a fitting portion 272. The entry portion 271 is in communication with the fitting portion 272, and the head 182 is smaller than the entry portion 271 but greater than the fitting portion 272.

On the basis of the above embodiment, when the first body 1 and the second body 2 are assembled, the head 182 of the fastened portion 18 is inserted into the entry portion 271 of the fastening portion 27, the first body 1 is then rotated (rotating the second body 2) to move the neck 181 of the fastened portion 18 into the fitting portion 272, hence forming a limiting effect by the head 182 and the fitting portion 272 so as to securely couple the first body 1 and the second body 2. When the alignment portion 121 of the first joint element 12 and the corresponding alignment portion 221 of the second joint element 22 butt and push against each other, the first joint element 12 and the second joint element 22 are enabled to recede simultaneously to compress the first elastic element 13 by the first joint element 12 and compress the second elastic element 23 by the second joint element 22, such that the first joint element 12 and the second joint element 22 push against each other and then generate the flow path of the fluid, for the fluid to flow in the first cavity 11 and the second cavity 21. Thus, the fluid enters the pipe 24 of the second body 2 and flows through the second cavity 21 to the first cavity 11, and is then guided by the pipe 14 of the first body 1 to a required position or apparatus, further enabling the required fluid to flow stably in the first body 1 and the second body 2.

In one embodiment of the present disclosure, the first joint element 12 may be provided with a fourth stop ring 120, and the second joint element 22 may be provided with a fifth stop ring 220. With the coordination of the fourth stop ring 120 and the fifth stop ring 220, the fluid is prevented from leaking from the first body 1 and the second body 2, thus enabling the fluid to flow stably in the first body 1 and the second body 2.

In one embodiment of the present disclosure, different from the above embodiments, the second assembly member 200 may be provided with a limiting portion 204, and further includes a body 205, a fastener 206 and an elastic body 207. The body 205 is disposed at the second assembly member 200, and the elastic body 207 pushes against between the body 205 and the fastener 206. Moreover, the first assembly member 100 is provided with a corresponding limiting portion 183. As such, when the fastened portion 18 is fitted and assembled with the fastening portion 27, the fastener 206 of the limiting portion 204 is fitted with the corresponding limiting portion 183, so that the first body 1 and the second body 2 are securely coupled.

In addition, the fastened portion 18 may also be disposed at the second body 2, and the fastening portion 27 may be disposed at the first body 1, so as to meet actual application requirements.

Figure 5:
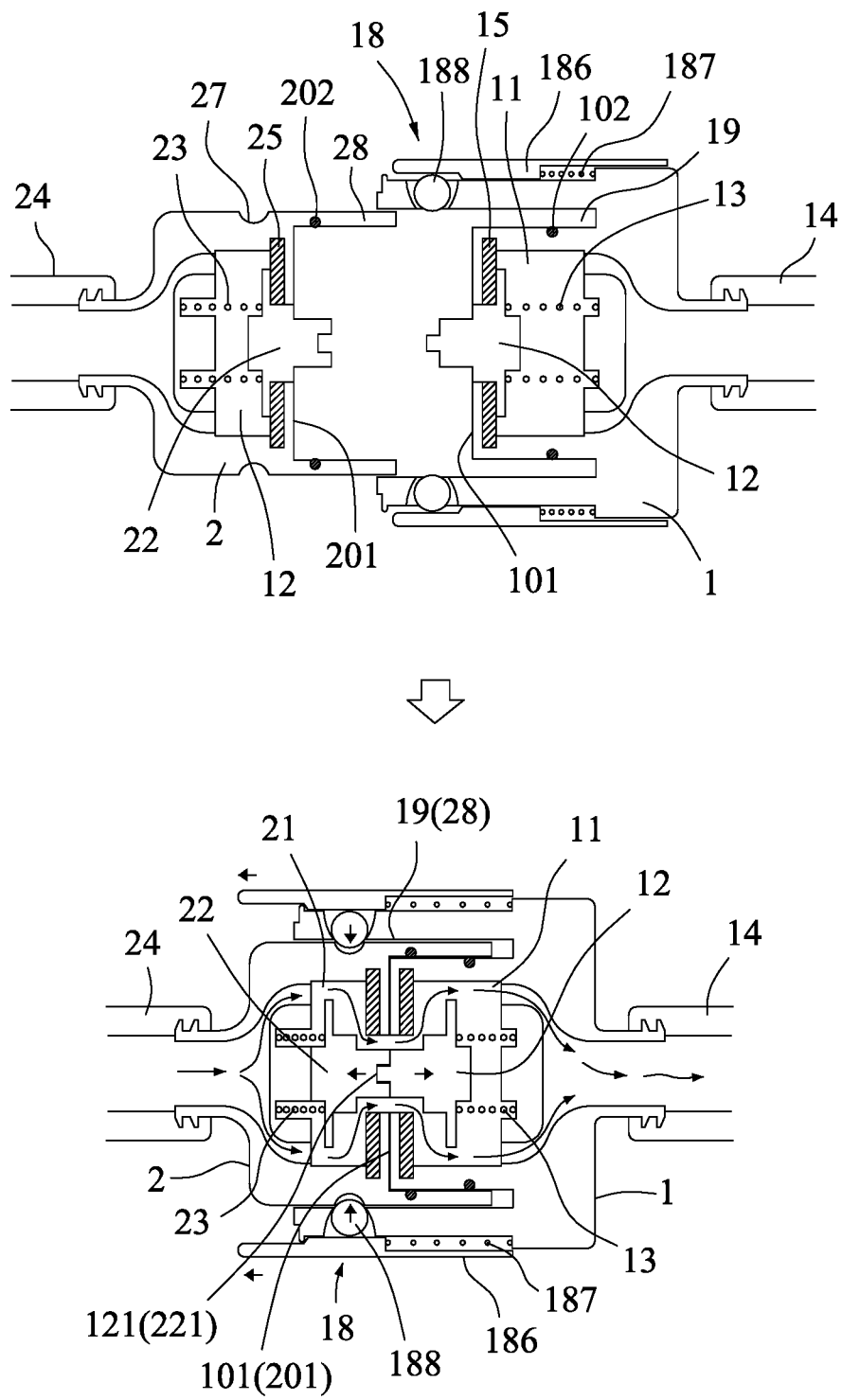
FIG. 5 is a schematic diagram of a state of use of a fluid joint structure according to a third embodiment of the present disclosure.

As shown in FIG. 5, in one embodiment of the present disclosure, different from the above embodiments, the first body 1 has a connecting portion 19, the second body 2 has a corresponding connecting portion 28, and the connecting portion 19 is joined with the corresponding connecting portion 28. The fastened portion 18 may be a combination of a slide sleeve 186, an elastic body 187 and a plurality of rollers 188. The fastening portion 27 may be a groove, the first body 1 has a first coupling portion 101, and the second body 2 has a second coupling portion 201.

On the basis of the above embodiment, when the first body 1 and the second body 2 are assembled, with the coordination of the slide sleeve 186 and the elastic body 187 of the fastened portion 18, the rollers 188 are fitted into the fastening portion 27 to form a limiting effect, so that the first body 1 and the second body 2 are securely coupled. Moreover, when the connecting portion 19 is joined with the corresponding connecting portion 28, the second coupling portion 201 and the first coupling portion 101 come into contact with each other, and the alignment portion 121 of the first joint element 12 and the corresponding alignment portion 221 of the second joint element 22 butt and push against each other, so that the first joint element 12 and the second joint element 22 recede simultaneously to compress the first elastic element 13 by the first joint element 12 and compress the second elastic element 23 by the second joint element 22, such that the first joint element 12 and the second joint element 22 push against each other and then generate the flow path of the fluid, for the fluid to flow in the first cavity 11 and the second cavity 21. Thus, the fluid enters the pipe 24 of the second body 2 and flows through the second cavity 21 to the first cavity 11, and is then guided by the pipe 14 of the first body 1 to a required position or apparatus, further enabling the required fluid to flow stably in the first body 1 and the second body 2.

Figure 6:
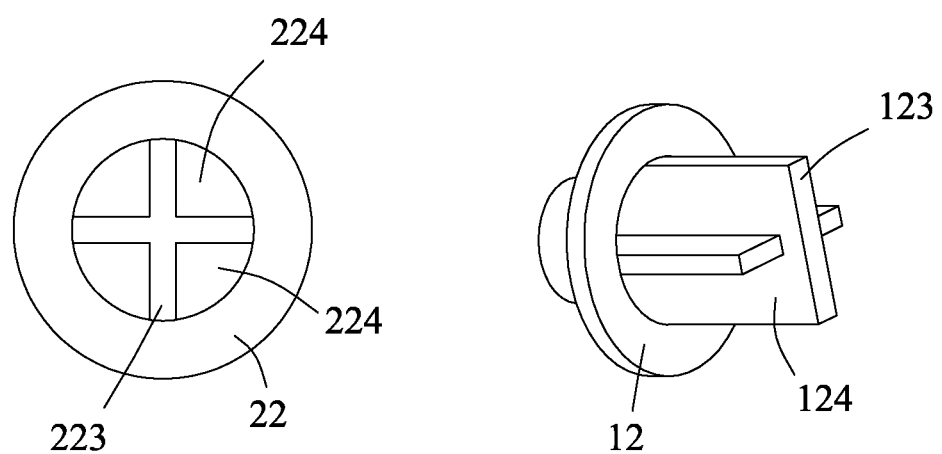
FIG. 6 is a schematic diagram of a first joint element and a second joint element of the present disclosure.
Figure 7:
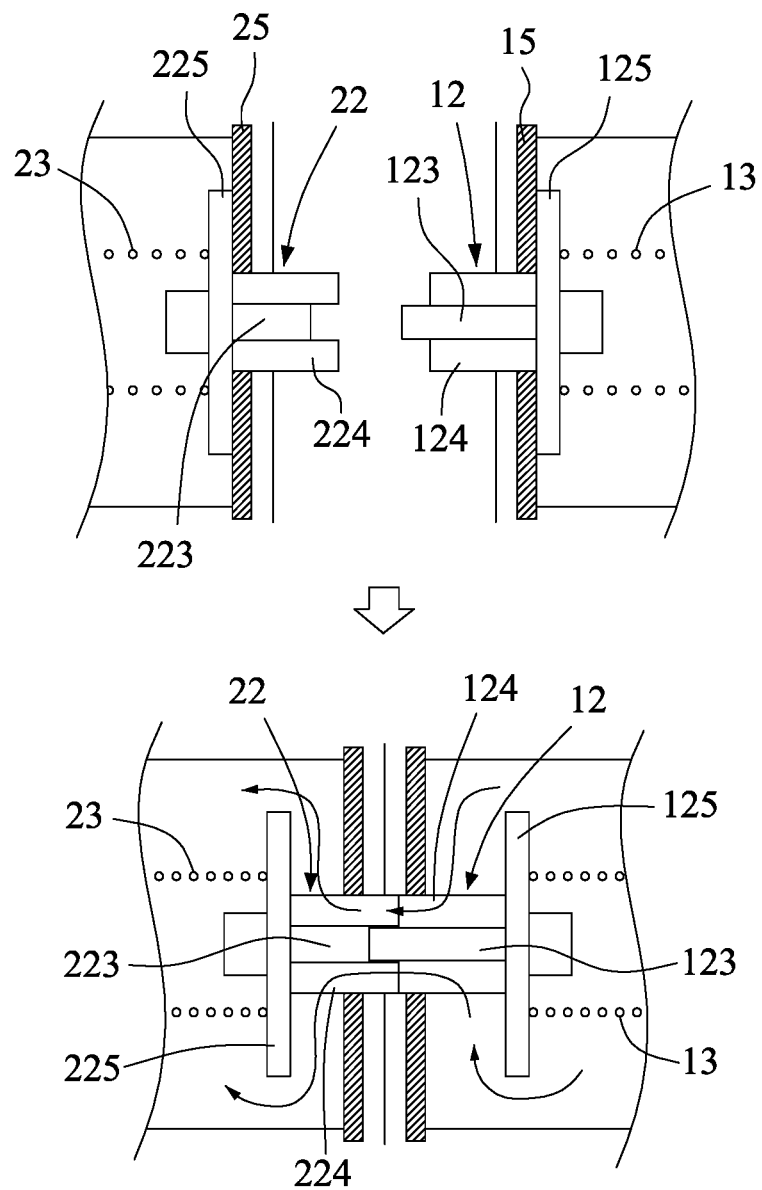
FIG. 7 is a schematic diagram of a first joint element and a second joint element of the present disclosure in an assembled state.

As shown in FIG. 6 and FIG. 7, in one embodiment of the present disclosure, different from the above embodiments, the first joint element 12 has a first joint portion 123 and at least a first flow path 124, the second joint element 22 has a second joint portion 223 and at least one second flow path 224, and the first joint portion 123 and the second joint portion 223 push against each other for the fluid to flow in the first flow path 124 and the second flow path 224. As such, the first joint portion 123 of the first joint element 12 and the second joint portion 223 of the second joint element 22 are enabled to butt and push against each other to mutually communicate the first flow path 124 and the second flow path 224, for the fluid to flow in the first flow path 124 and the second flow path 224, further enabling the required fluid to flow stably in the first body 1 and the second body 2.

In one embodiment of the present disclosure, the first flow path 124 and the second flow path 224 are grooves, recesses, pipes, protrusions, holes or steps, so that the present disclosure can meet actual application requirements.

In one embodiment of the present disclosure, the first joint element 12 has a first block portion 125, the second joint element 22 has a second block portion 225, the first block portion 125 blocks the first body 1, and the second block portion 225 blocks the second body 2. As such, the first block portion 125 of the first joint element 12 can coordinate with the first stop ring 15 to prevent the fluid from leaking from the first body 1 and the second body 2, and the second block portion 225 of the second joint element 22 can coordinate with the second stop ring 25 to prevent the fluid from leaking from the first body 1, for the fluid to flow stably in the first body 1 and the second body 2.

Figure 8:
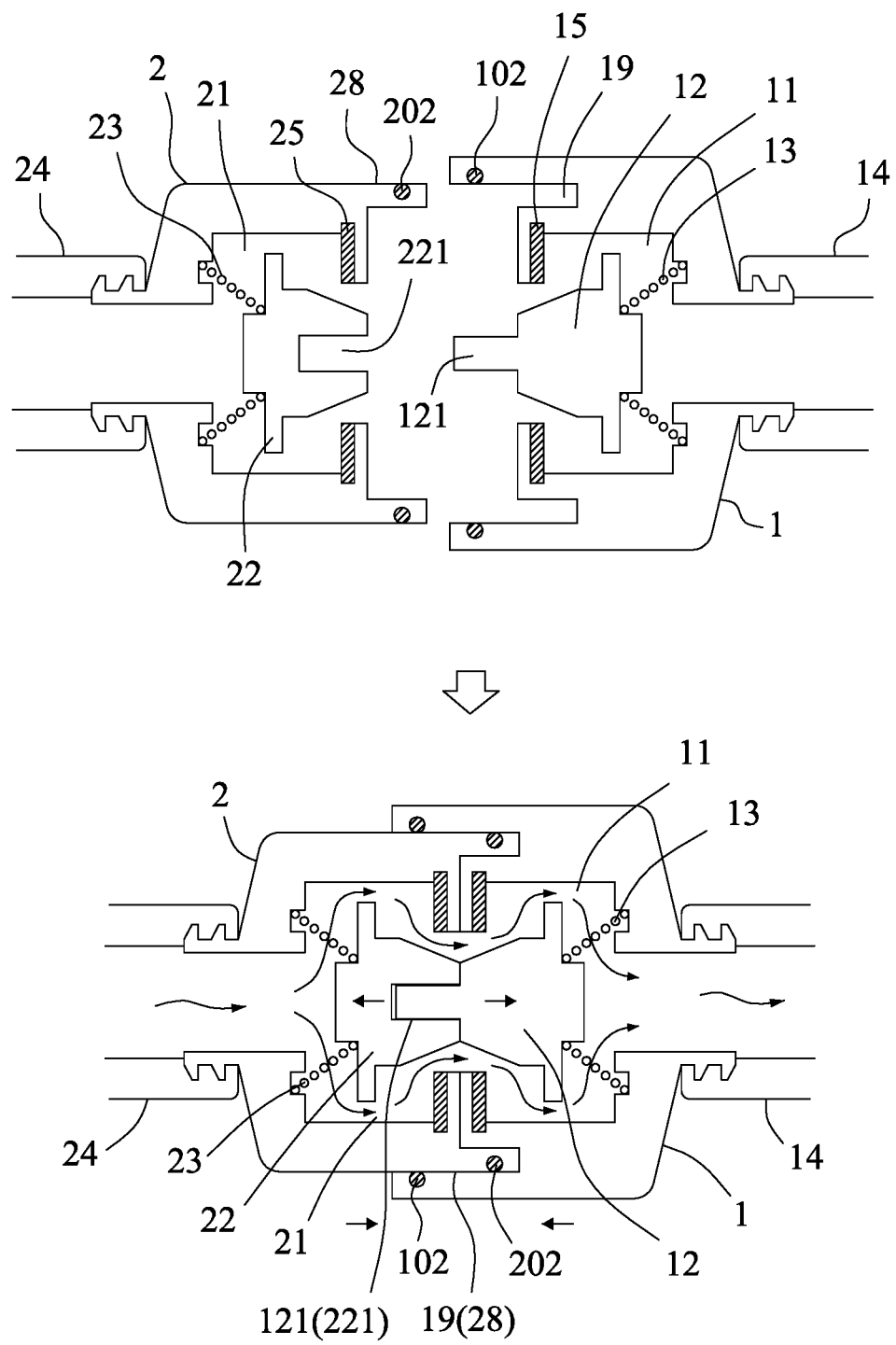
FIG. 8 is a schematic diagram of a state of use of a fluid joint structure according to a fourth embodiment of the present disclosure.

As shown in FIG. 8, in one embodiment of the present disclosure, different from the above embodiments, the first body 1 has a connecting portion 19, the second body 2 has a corresponding connecting portion 28, and the connecting portion 19 is joined with the corresponding connecting portion 28. Moreover, stop rings 102 and 202 are disposed at the first body 1 and the second body 2, respectively.

On the basis of the above embodiment, when the first body 1 and the second body 2 are assembled, the second coupling portion 201 and the first coupling portion 101 come into contact with each other by joining the connecting portion 19 with the corresponding connecting portion 28, so that the first body 1 and the second body 2 are coupled stably by using the stop rings 102 and 202 to prevent leakage of the fluid. Moreover, the alignment portion 121 of the first joint element 12 and the corresponding alignment portion 221 of the second joint element 22 butt and push against each other, so that the first joint element 12 and the second joint element 22 recede simultaneously to compress the first elastic element 13 by the first joint element 12 and compress the second elastic element 23 by the second joint element 22, such that the first joint element 12 and the second joint element 22 push against each other and then generate the flow path of the fluid, for the fluid to flow in the first cavity 11 and the second cavity 21. Thus, the fluid enters the pipe 24 of the second body 2 and flows through the second cavity 21 to the first cavity 11, and is then guided by the pipe 14 of the first body 1 to a required position or apparatus, further enabling the required fluid to flow stably in the first body 1 and the second body 2.

Figure 9:
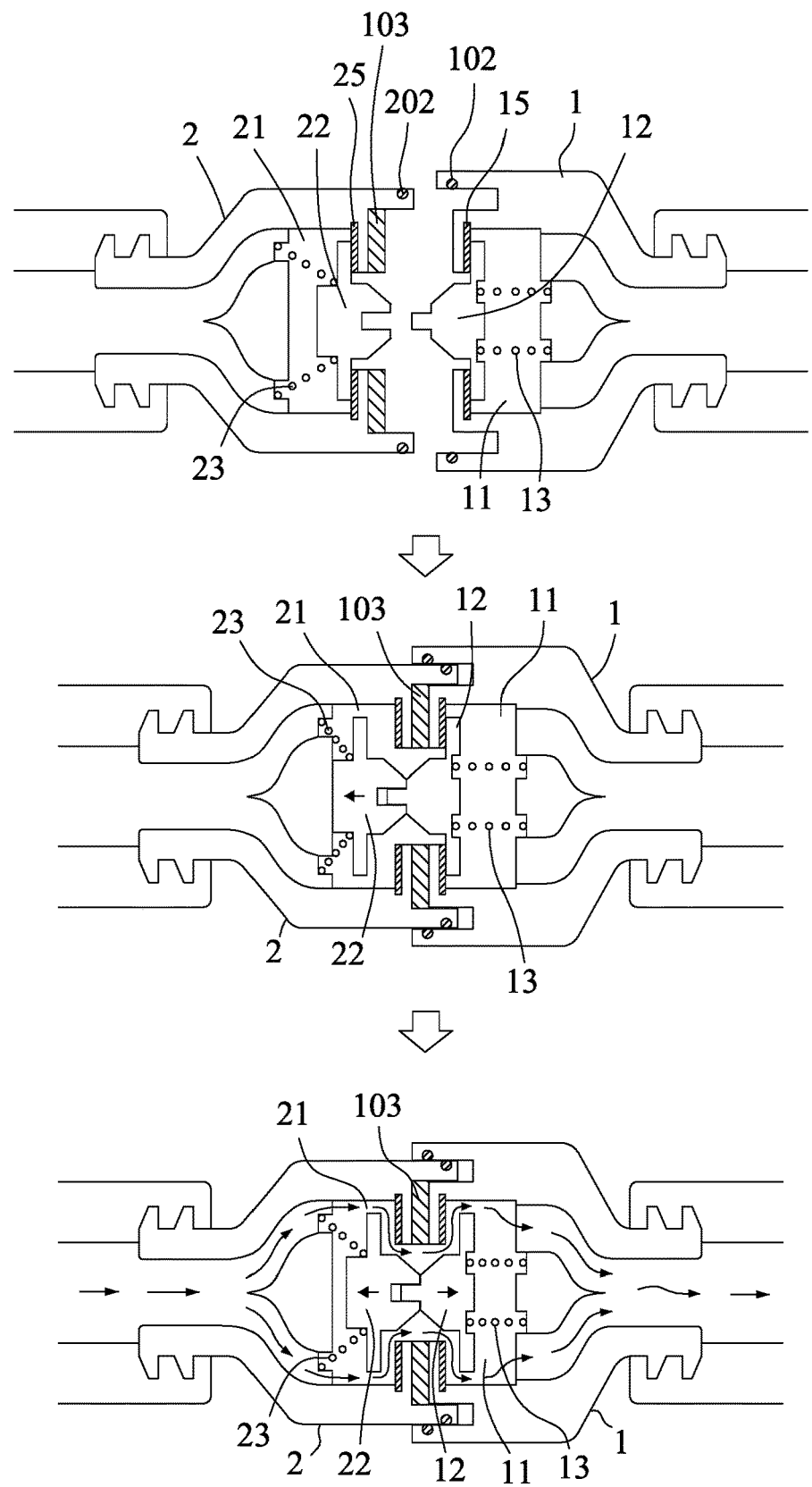
FIG. 9 is a schematic diagram of a state of use of a fluid joint structure according to a fifth embodiment of the present disclosure.

As shown in FIG. 9, in one embodiment of the present disclosure, different from the above embodiments, the elastic force of the first elastic element 13 is greater than the elastic force of the second elastic element 23 (or the length, thickness or width of the second elastic element 23 is smaller than, greater than or equal to that of the first elastic element 13), and the first joint element 12 coordinates with the first elastic element 13 to push against the second joint element 22 and the second elastic element 23 to recede (or the second elastic element 23 cannot recede any further, or the structure of the second elastic element 23 cannot recede any further, or the second elastic element 23 is compressed to an extent of no remaining elastic space, or the second elastic element 23 is compressed to be in an overlapping state). Moreover, when the second coupling portion 201 comes into contact with the first coupling portion 101, the second joint element 22 pushes against the second body 2 and then the second joint element 22 pushes against the first joint element 12 to recede so as to generate the flow path of the fluid, for the fluid to flow in the first cavity 11 and the second cavity 21.

Moreover, according to requirements, the elastic force of the second elastic element 23 is greater than the elastic force of the first elastic element 13 (or the length, thickness or width of the first elastic element 13 is smaller than, greater than or equal to that of the second elastic element 23), the second joint element 22 coordinates with the second elastic element 23 to push against the first joint element 12 and the first elastic element 13 to recede (or the first elastic element 13 cannot recede any further, or the structure of the first elastic element 13 cannot recede any further, or the first elastic element 13 is compressed to an extent of no remaining elastic space, or the first elastic element 13 is compressed to be in an overlapping state), and then the first joint element 12 pushes against the second joint element 22 to recede so as to generate the flow path of the fluid, thereby meeting requirements of different flow directions of the fluid.

In one embodiment of the present disclosure, a fluid barrier 103 (or a fluid absorber) is provided between the first body 1 and the second body 2. The flow barrier 103 (or the flow absorber) is compressed (or is not compressed) when the first body 1 is joined with the second body 2, and the flow barrier 103 (or the flow absorber) is configured to be adjacent to (or close to) the first joint element 12 and the second joint element 22, so as to stop, guide or absorb the fluid. Alternatively, when the first body 1 and the second body 2 are separated or assembled, the flow absorber absorbs the fluid before the first joint element 12 and the second joint element 22 are not closed.

In one embodiment of the present disclosure, the flow barrier 103 (or the flow absorber) is an elastic body, a liquid absorbing body, a glue body or a sponge body, so as to meet actual application requirements.

In one embodiment of the present disclosure, the flow barrier 103 (or the flow absorber) is arranged by means of engaging, adhesion, locking or fitting, so as to meet actual application requirements.

Figure 10:
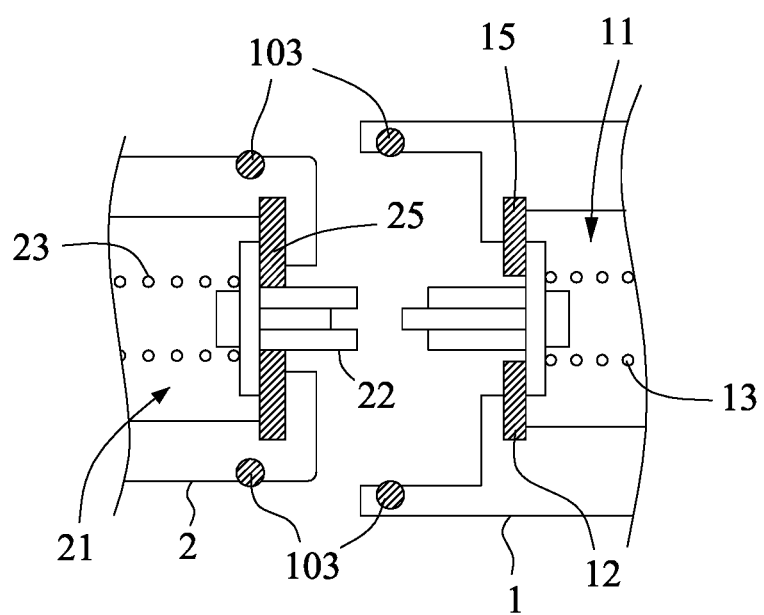
FIG. 10 is a schematic diagram of a state of use of a fluid joint structure according to a sixth embodiment of the present disclosure.

In one embodiment of the present disclosure, the flow barrier 103 (or the flow absorber) is a flow barrier structure or a flow absorber structure protruding or recessed between the first body 1 and the second body 2, so as to meet actual application requirements (as shown in FIG. 10).

In one embodiment of the present disclosure, the flow barrier 103 (or the flow absorber) is an O ring, a water stop ring, a rubber ring or a washer, so as to meet actual application requirements.

Referring to FIG. 10, in one embodiment of the present disclosure, a difference from the above embodiment is that, the first body 1 and the fastened portion 18 may be lockingly assembled, and the second body 2 and the fastening portion 27 may be lockingly assembled. Thus, the first body 1 and the second body 2 are enabled to meet different application requirements.

Figure 11:
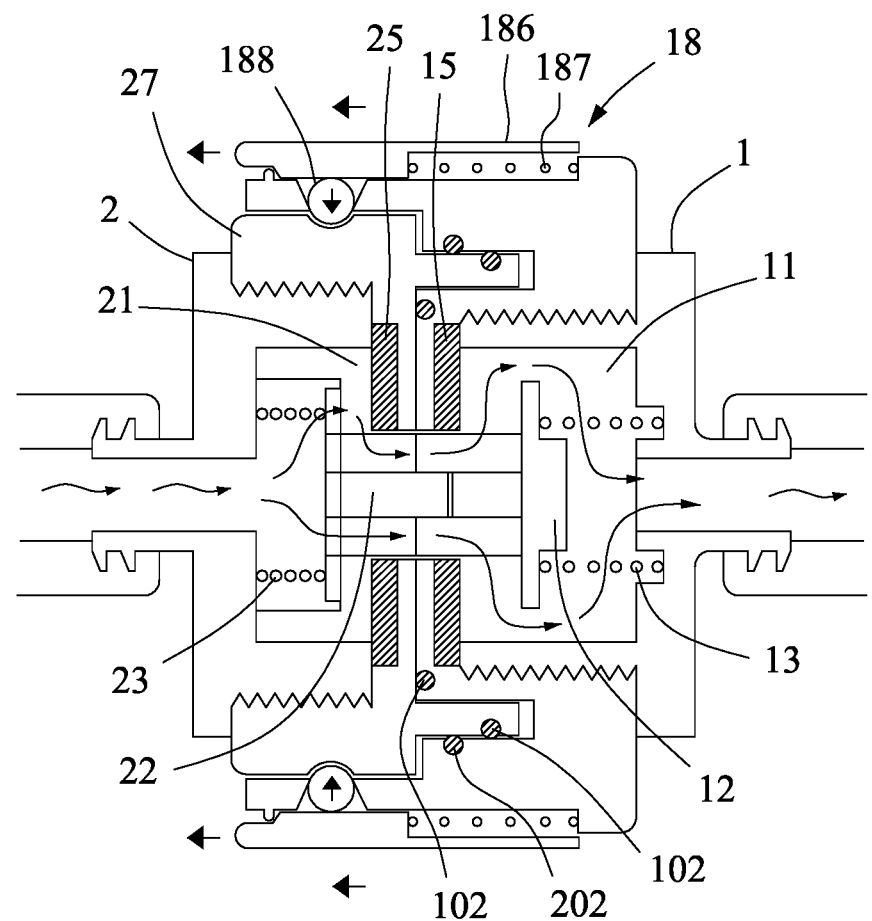
FIG. 11 is a schematic diagram of a state of use of a fluid joint structure according to a seventh embodiment of the present disclosure.
Figure 12:
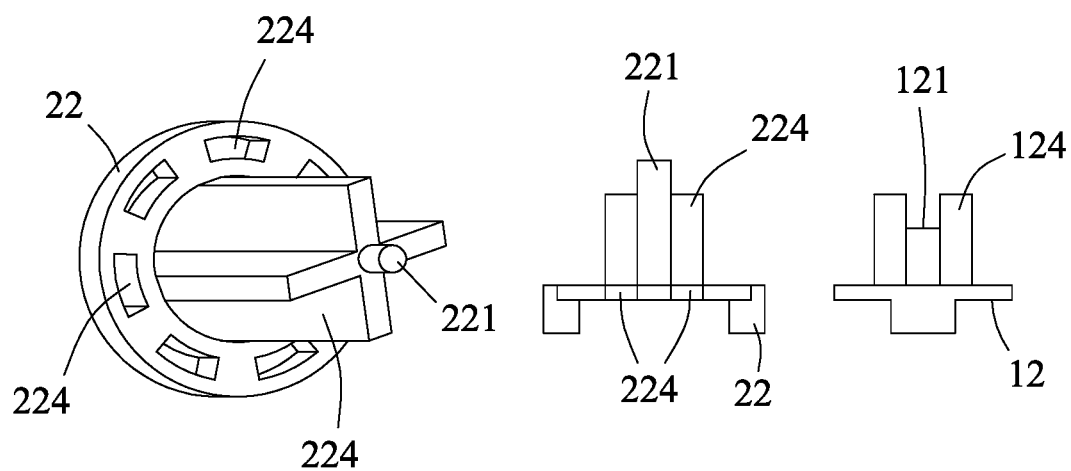
FIG. 12 is a first schematic diagram of a first joint element and a second joint element of the present disclosure in different forms.

Referring to FIG. 11 and FIG. 12, in one embodiment of the present disclosure, different from the above embodiments, the first joint element 12 has an alignment portion 121 and at least one first flow path 124, and the second joint element 22 has a corresponding alignment portion 221 and at least one second flow path 224. As such, the alignment portion 121 of the first joint element 12 and the corresponding alignment portion 221 of the second joint element 22 are enabled to butt and push against each other to mutually communicate the first flow path 124 and the second flow path 224, for the fluid to flow in the first flow path 124 and the second flow path 224, further enabling the required fluid to flow stably in the first body 1 and the second body 2.

Figure 13:
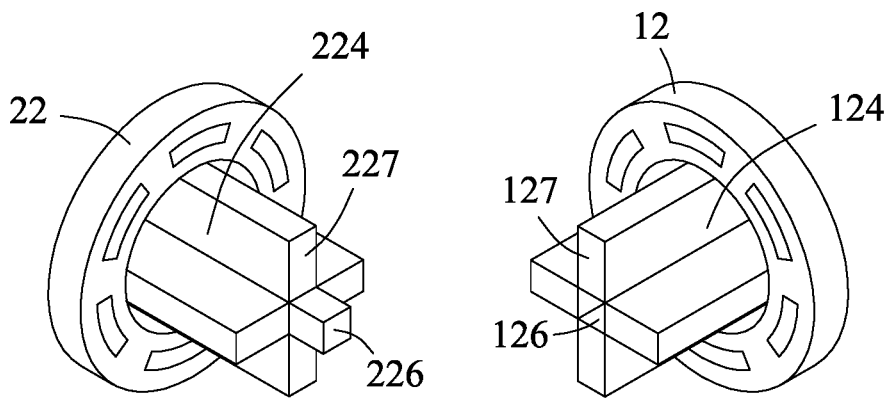
FIG. 13 is a second schematic diagram of a first joint element and a second joint element of the present disclosure in different forms.
Figure 14:
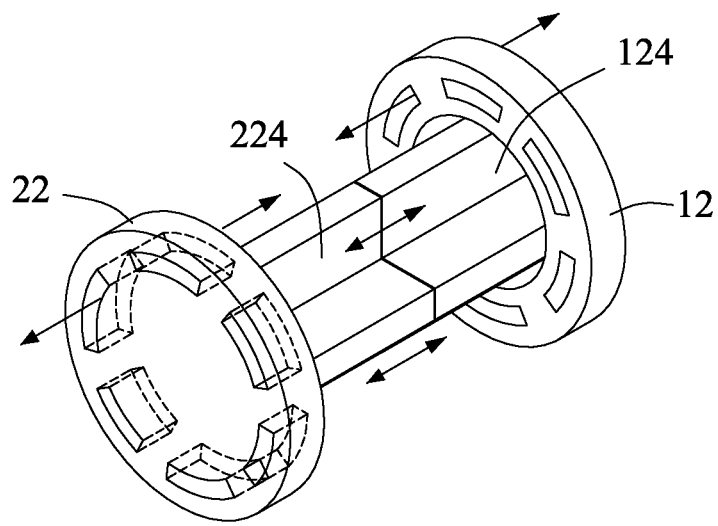
FIG. 14 is a third schematic diagram of a first joint element and a second joint element of the present disclosure in different forms.
Figure 15:
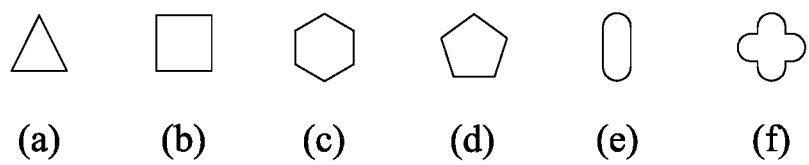
FIG. 15 is a fourth schematic diagram of a first joint element and a second joint element of the present disclosure in different forms.

Referring to FIG. 13 to FIG. 17, in one embodiment of the present disclosure, different from the above embodiments, the first joint element 12 has a corresponding anti-rotation portion 126, the second joint element 22 has an anti-rotation portion 226, and the corresponding anti-rotation portion 126 and the anti-rotation portion 226 are configured for mutual anti-rotation so as to increase flow (as shown in FIG. 13 and FIG. 14).

In one embodiment of the present disclosure, the first joint element 12 has a corresponding anti-rotation portion 126 and a first pushing portion 127, the second joint element 22 has an anti-rotation portion 226 and a second pushing portion 227, and the corresponding anti-rotation portion 126 and the anti-rotation portion 226 are configured for mutual anti-rotation to have the first pushing portion 127 and the second pushing portion 227 correspond to each other so as to increase flow (as shown in FIG. 13 and FIG. 14).

In one embodiment of the present disclosure, the corresponding anti-rotation portion 126 or the anti-rotation portion 226 may be a triangular body (as part a in FIG. 15), a tetragonal body (as part b in FIG. 15), a pentagonal body (as part c in FIG. 15), a hexagonal body (as part d in FIG. 15), an ellipsoidal body (as part e in FIG. 15), a convex body (as part f in FIG. 15), a concave body, a groove, a polygonal body or a rectangular body.

Figure 16:
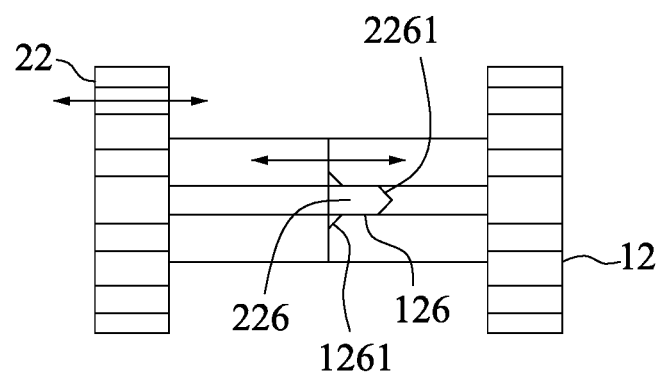
FIG. 16 is a fifth schematic diagram of a first joint element and a second joint element of the present disclosure in different forms.

In one embodiment of the present disclosure, the anti-rotation portion 226 (or the second joint element 22) has a guide portion 2261, the corresponding anti-rotation portion 126 (or the first joint element 12) has a corresponding guide portion 1261, and the guide portion 2261 and the corresponding guide portion 1261 are configured to guide the anti-rotation portion 226 and the corresponding anti-rotation portion 126 to assemble with each other (as shown in FIG. 16).

Figure 17:
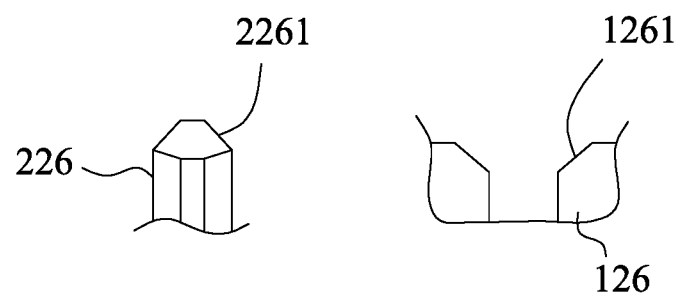
FIG. 17 is a sixth schematic diagram of a first joint element and a second joint element of the present disclosure in different forms.

In one embodiment of the present disclosure, the guide portion 2261 or the corresponding guide portion 1261 is an inclined surface (as shown in FIG. 17), a curved surface, an arc surface, a step, a protrusion or a recess.

Figure 18:
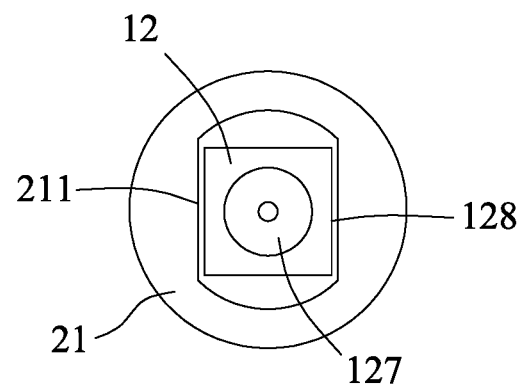
FIG. 18 is a seventh schematic diagram of a first joint element and a second joint element of the present disclosure in different forms.

Referring to FIG. 18, in one embodiment of the present disclosure, different from the above embodiments, the first joint element 12 (or the second joint element 22) has a stop portion 128, the second cavity 21 (or the first cavity 11) has a corresponding stop portion 211, and the stop portion 128 and the corresponding stop portion 211 are configured for corresponding anti-rotation, so as to enable the present disclosure to meet different application requirements.

Figure 19:
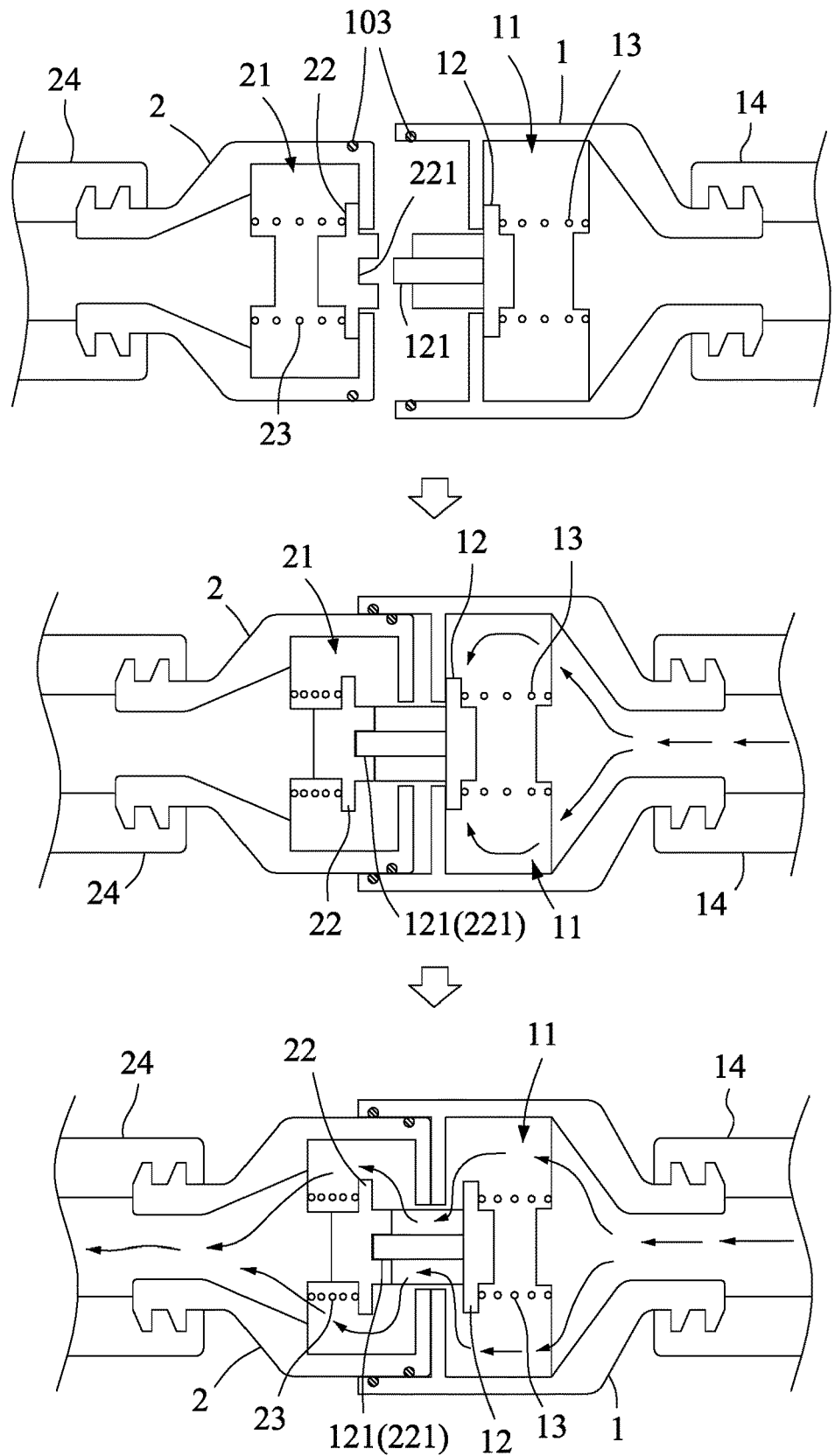
FIG. 19 is a schematic diagram of an appearance of a fluid joint structure according to an eighth embodiment of the present disclosure.
Figure 20:
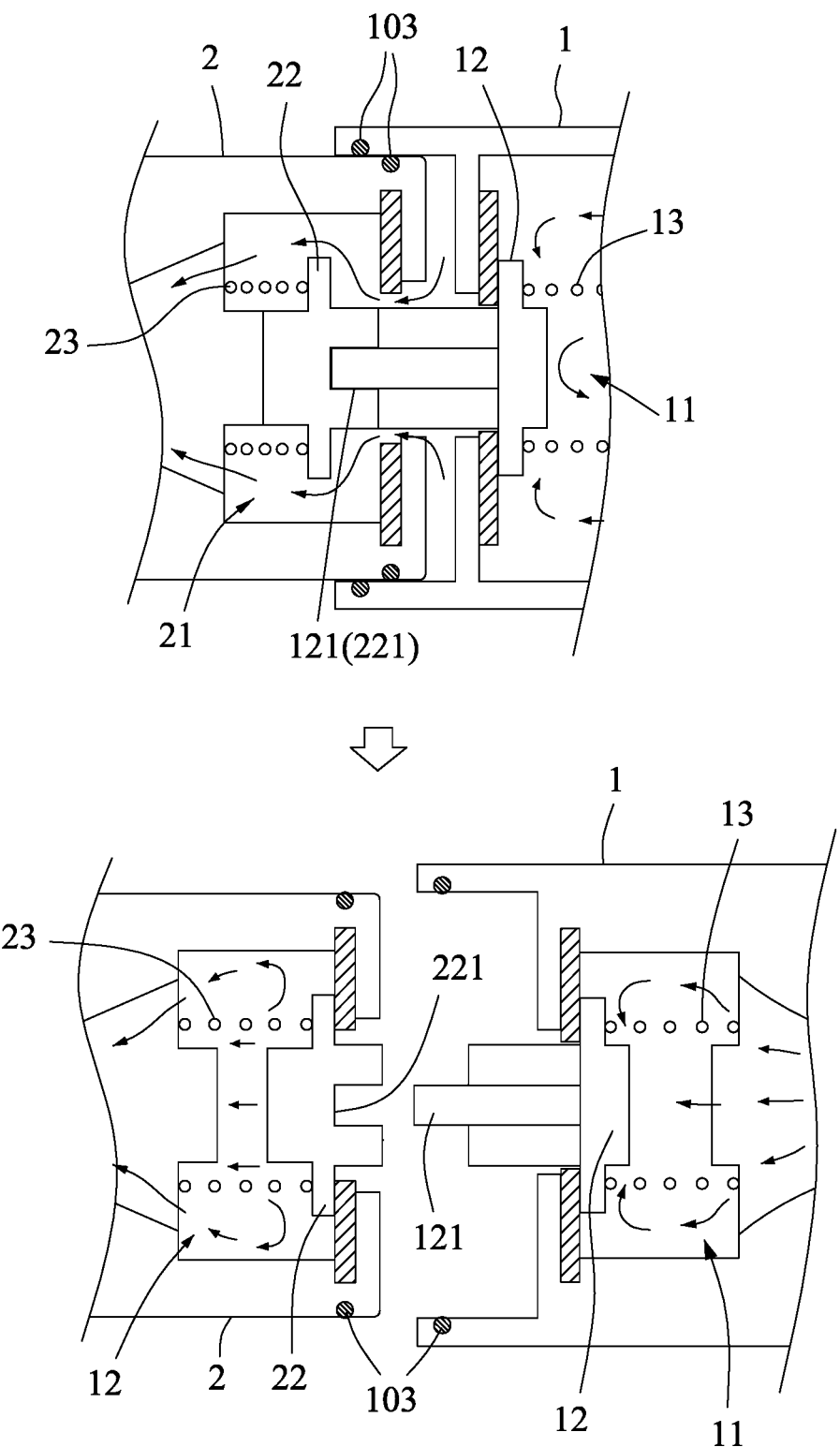
FIG. 20 is a schematic diagram of an appearance of a fluid joint structure according to a ninth embodiment of the present disclosure.

Referring to FIG. 19 and FIG. 20, in one embodiment of the present disclosure, different from the above embodiments, the elastic force of the first elastic element 13 is greater than the elastic force of the second elastic element 23 (or a travel stroke of the first elastic element 13 is smaller than, greater than, equal to or similar to that of the second elastic element 23). When the first body 1 and the second body 2 are separated, the first joint element 12 first closes the first cavity 11 and then the second joint element 22 closes the second cavity 21, so as to enable the present disclosure to meet different application requirements.

In one embodiment of the present disclosure, the elastic force of the first elastic element 13 is greater than the elastic force of the second elastic element 23 (or a travel stroke of the first elastic element 13 is smaller than, greater than, equal to or similar to that of the second elastic element 23), and the fluid flows from the first body 1 toward the second body 2. Moreover, when the first body 1 and the second body 2 are separated, the first joint element 12 first closes the first cavity 11, the fluid residing between the first body 1 and the second body 2 flows into the second cavity 21 due to the elastic force, the pressure of the fluid, the pressure of the flow direction or the inertia, and then the second joint element 22 closes the second cavity 21, so as to enable the present disclosure to meet different application requirements.

In one embodiment of the present disclosure, the elastic force of the first elastic element 13 is greater than the elastic force of the second elastic element 23 (or the elastic force of the second elastic element 23 is greater than that of the first elastic element 13, or a travel stroke of the first elastic element 13 is smaller than, greater than, equal to or similar to that of the second elastic element 23), and the fluid flows from the first body 1 toward the second body 2. When the first body 1 and the second body 2 are separated, the first joint element 12 first closes the first cavity 11 to meet different application requirements, the fluid residing between the first body 1 and the second body 2 flows into the second cavity 21 due to the elastic force of the first elastic element 13, or the force of fluid flowing from the first cavity 11 to the second cavity 21, or the pressure or inertia of the fluid flowing from the first cavity 11 to the second cavity 21, and then the second joint element 22 closes the second cavity 21, so as to enable the present disclosure to meet different application requirements.

In one embodiment of the present disclosure, when the first body 1 and the second body 2 are separated, the first joint element 12 first closes the first cavity 11, the fluid residing between the first body 1 and the second body 2 flows into the second cavity 21 due to the elastic force, the pressure of the fluid, the pressure of the flow direction, the inertia, the attraction or the center gravity, and then the second joint element 22 closes the second cavity 21, so as to enable the present disclosure to meet different application requirements.

In one embodiment of the present disclosure, the fluid may also flow from the second body 2 toward the first body 1. When the first body 1 and the second body 2 are separated, the second joint element 22 first closes the second cavity 21, or the fluid residing between the second body 2 and the first body 1 flows into the first cavity 11 due to the elastic force, the pressure of the fluid, the pressure of the flow direction or the inertia, and then the first joint element 12 closes the first cavity 11, so as to enable the present disclosure to meet different application requirements.

Figure 21:
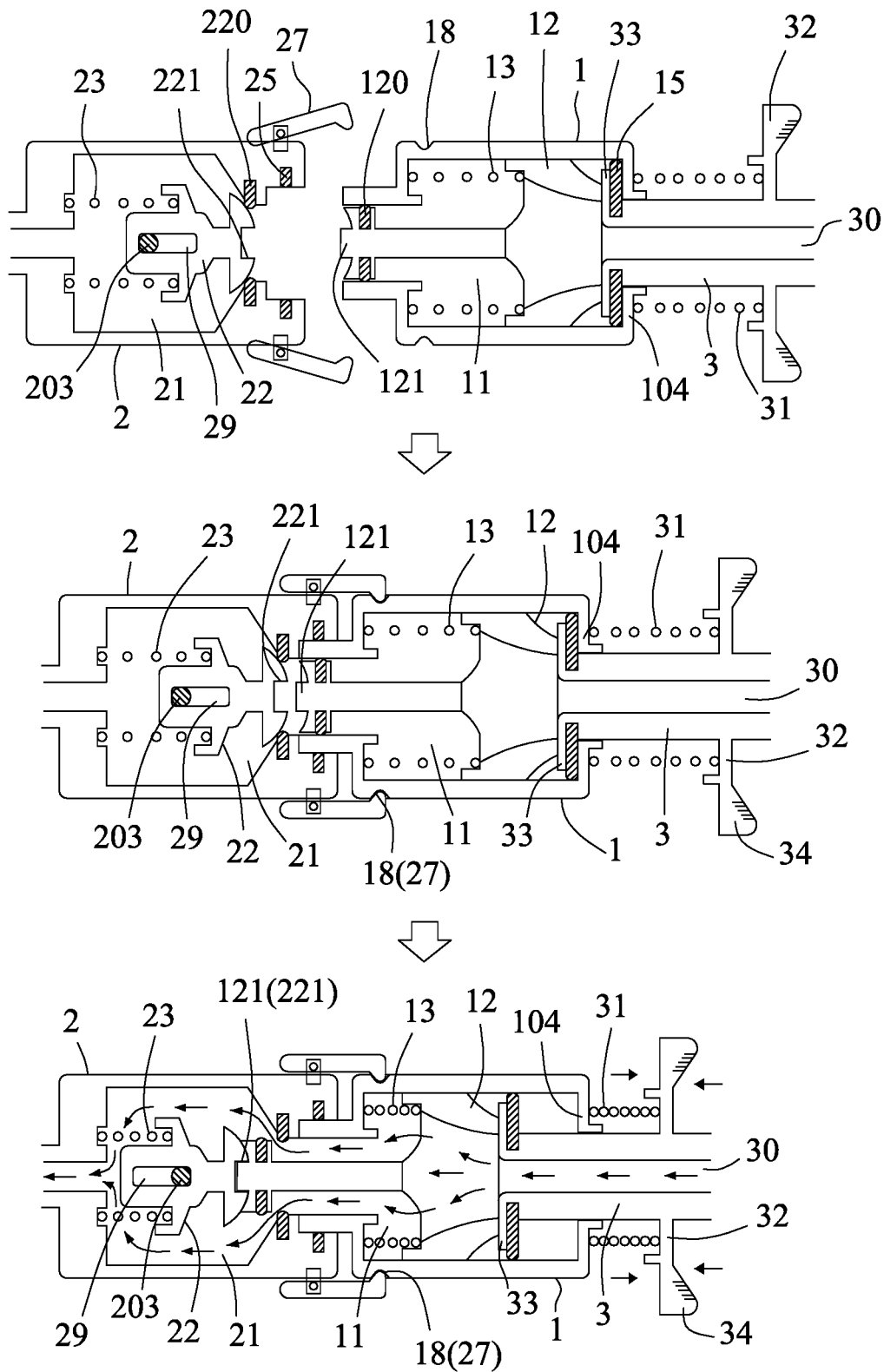
FIG. 21 is a schematic diagram of an appearance of a fluid joint structure according to a tenth embodiment of the present disclosure.
Figure 22:
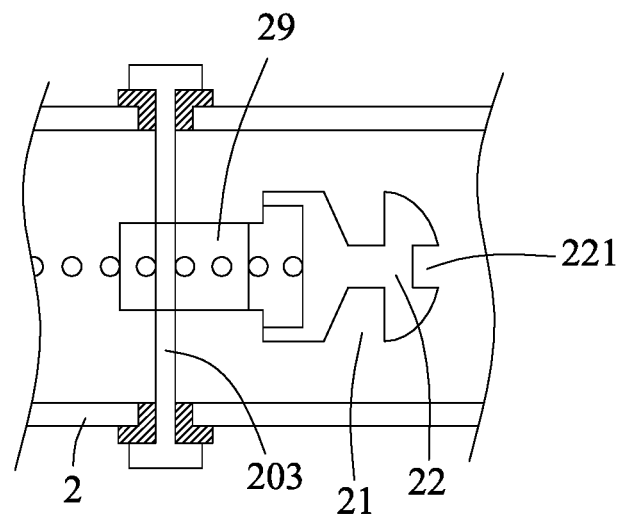
FIG. 22 is a schematic diagram of a second body and a second joint element of the present disclosure in an assembled state.

Referring to FIG. 21 and FIG. 22, in one embodiment of the present disclosure, a difference from the above embodiment is that, in addition to the first body 1 and the second body 2, the fluid joint structure further includes a motion unit 3.

The first body 1 includes a first cavity 11. The first cavity 11 is movably provided with a first joint element 12. The first joint element 12 is configured to stop a fluid in the first cavity 11.

The second body 2 includes a second cavity 21. The second cavity 21 is movably provided with a second joint element 22. A second elastic element 23 is provided between the second cavity 21 and the second joint element 22. The second joint element 22 is configured to stop a fluid in the second cavity 21, and the first body 1 is joined with the second body 2.

The motion unit 3 is movably assembled at the first body 1 (or movably assembled at the second body 2). The motion unit 3 and the first joint element 12 push against the second joint element 22 to generate a flow path of a fluid, for the fluid to flow in the first cavity 11 and the second cavity 21.

In a joint method of the fluid joint structure according to an embodiment of the present disclosure, the first body 1 is joined with the second body 2, such that the motion unit 3 pushes against the first joint element 12 and the first joint element 12 pushes against the second joint element 22 to generate a flow path of a fluid, for the fluid to flow in the first cavity 11 and the second cavity 21. For example, the fluid flows in a direction from the second cavity 21 toward the first cavity 11, or the fluid flows in a direction from the first cavity 11 toward the second cavity 21, further enabling a required fluid to flow stably in the first body 1 and the second body 2.

In one embodiment of the present disclosure, a first elastic element 13 is provided between the first cavity 11 and the first joint element 12, the motion unit 3 is located on one side of the first body 1, one end of the first elastic element 13 pushes against the first joint element 12 and the other end of the first elastic element 13 pushes against the other side of the first body 1, such that the first joint element 12 normally leans against the motion unit 3 and corresponds to the second joint element 22, so as to stop the fluid flowing through the first cavity 11. One end of the second elastic element 23 pushes against the second joint element 22 and the other end of the second elastic element 23 pushes against one side of the second body 2, such that the second joint element 22 normally leans against the other side of the second body 2 and corresponds to the first joint element 12, so as to stop the fluid flowing through the second cavity 21.

On the basis of the above embodiment, when the fluid enters a fluid conduit 30 of the motion unit 3, the first elastic element 13 may coordinate with the first joint element 12 to stop the fluid entering the first cavity 11. Once the first body 1 is joined with the second body 2, the fastened portion 18 and the fastening portion 27 are fastened with each other, and the alignment portion 121 of the first joint element 12 and the corresponding alignment portion 221 of the second joint element 22 butt with each other. Then, the motion unit 3 pushes against the first joint element 12 and compresses the first elastic element 13, and the first joint element 12 pushes against the second joint element 22 and compresses the second elastic element 23, such that the first joint element 12 and the second joint element 22 push against each other to generate the flow path of the fluid, for the fluid to flow in the first cavity 11 and the second cavity 21. Thus, the fluid enters the motion unit 3 and flows through the first cavity 11 to the second cavity 21, and is then guided by the second body 2 to a required position or apparatus to further enable the required fluid to flow stably in the first body 1 and the second body 2.

In one embodiment of the present disclosure, a third elastic element 31 is provided between the motion unit 3 and the first body 1, and the motion unit 3 has a stop portion 32. One end of the third elastic element 31 pushes against the first body 1, and the other end of the third elastic element 31 pushes against the stop portion 32. Thus, with the pushing of the third elastic element 31, the motion unit 3 is enabled to be normally located at a position at which the first joint element 12 is not pushed against. When a force is applied to push against the motion unit 3, the third elastic element 31 is compressed, and when the force is not applied on the motion unit 3, the third elastic element 31 pushes against the motion unit 3 to be reset since the elastic force is released, thereby facilitating the motion unit 3 to again perform the function of pushing.

In one embodiment of the present disclosure, the second joint element 22 has a motion space 29, and the second joint element 22 coordinates with the motion space 29 by an insertion portion 203 so as to be movably disposed in the second cavity 21. As such, with the coordination of the motion space 29 and the insertion portion 203, the second joint element 22 is enabled to move stably in the second cavity 21.

In one embodiment of the present disclosure, the motion unit 3 is provided with a block portion 33, the first body 1 is provided with a corresponding block portion 104, and the block portion 33 and the corresponding block portion 104 are mutually stopped, so as to prevent the motion unit 3 from moving out of the first body 1 and to maintain a stable movement of the motion unit 3.

In one embodiment of the present disclosure, the motion unit 3 has an operating portion 34, and the operating portion 34 controls the first joint element 12. As such, a force may be applied to the operating portion 34 to control the motion unit 3 to enable the motion unit 3 to push against the first joint element 12.

In one embodiment of the present disclosure, the first joint element 12 and the motion unit 3 may be a multi-piece structure (for example, a two-piece structure), or the first joint element 12 and the motion unit 3 are an integrally formed structure. When the first joint element 12 and the motion unit 3 are an integrally formed structure, the motion unit 3 may link the first joint element 12, such that the first joint element 12 pushes against the second joint element 22 to generate the flow path of the fluid, for the fluid to flow in the first cavity 11 and the second cavity 21. For example, the fluid flows in a direction from the second cavity 21 toward the first cavity 11, or the fluid flows in a direction from the first cavity 11 toward the second cavity 21 to further enable the required fluid to flow stably in the first body 1 and the second body 2, so that the present disclosure can better meet actual application requirements.

Figure 23:
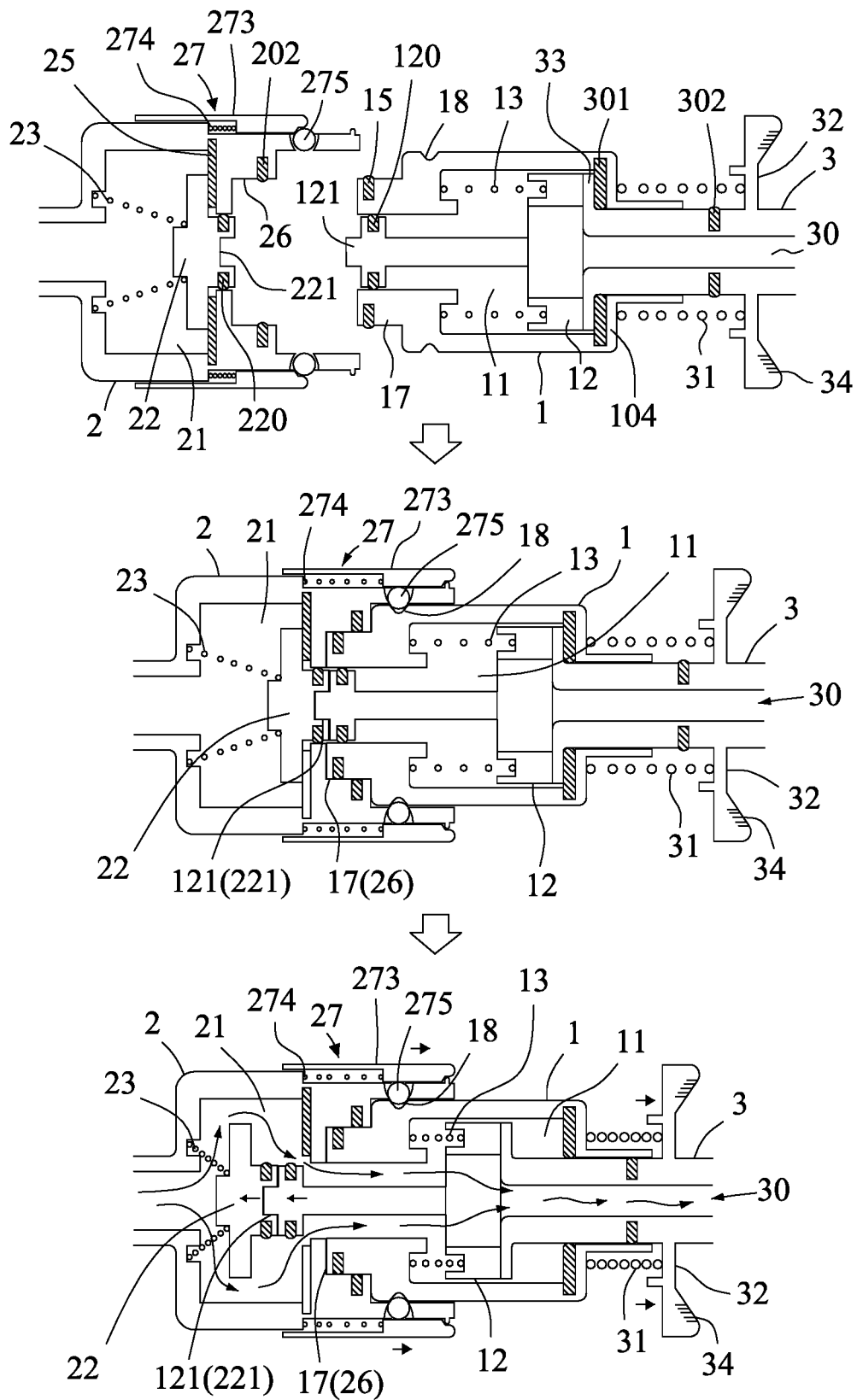
FIG. 23 is a schematic diagram of a state of use of a fluid joint structure according to an eleventh embodiment of the present disclosure.

Referring to FIG. 23, in one embodiment of the present disclosure, a difference from the above embodiment is that, the fastened portion 18 of the first body 1 may be a groove, and the fastening portion 27 of the second body 2 may be a combination including a slide sleeve 273, an elastic body 274 and a plurality of rollers 275.

On the basis of the above embodiments, when the first body 1 and the second body 2 are assembled, with the coordination of the slide sleeve 273 and the elastic body 274 of the fastening portion 27, the rollers 275 are fitted into the fastened portion 18 to form a limiting effect, thereby securely coupling the first body 1 and the second body 2 to further enable a required fluid to flow stably flow in the first body 1 and the second body 2.

In one embodiment of the present disclosure, the motion unit 3 may be provided with a sixth stop ring 301 and a seventh stop ring 302, so as to maintain airtightness between the motion unit 3 and the first body 1 to achieve the effect of preventing leakage of the fluid.

Figure 24:
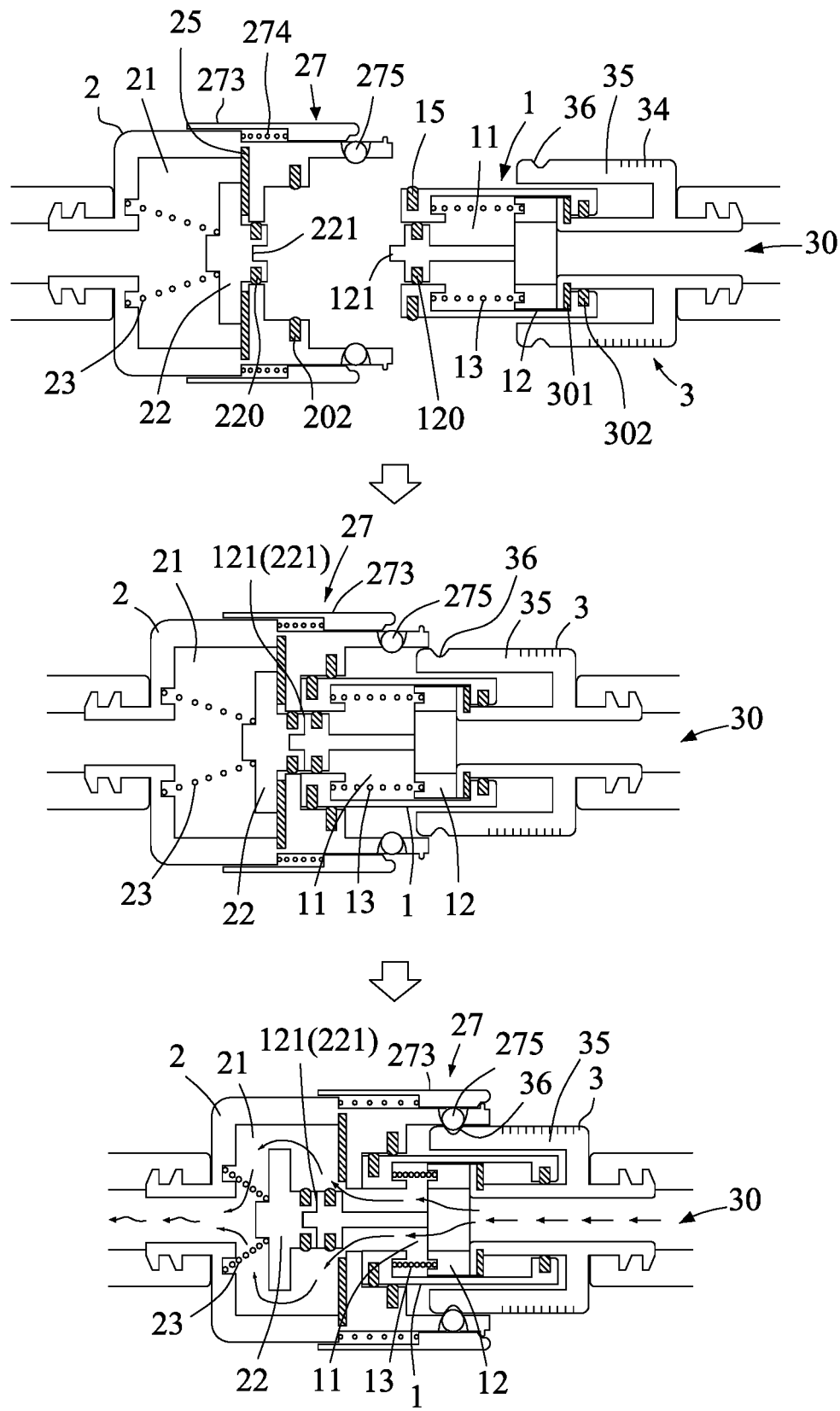
FIG. 24 is a schematic diagram of a state of use of a fluid joint structure according to a twelfth embodiment of the present disclosure.
Figure 25:
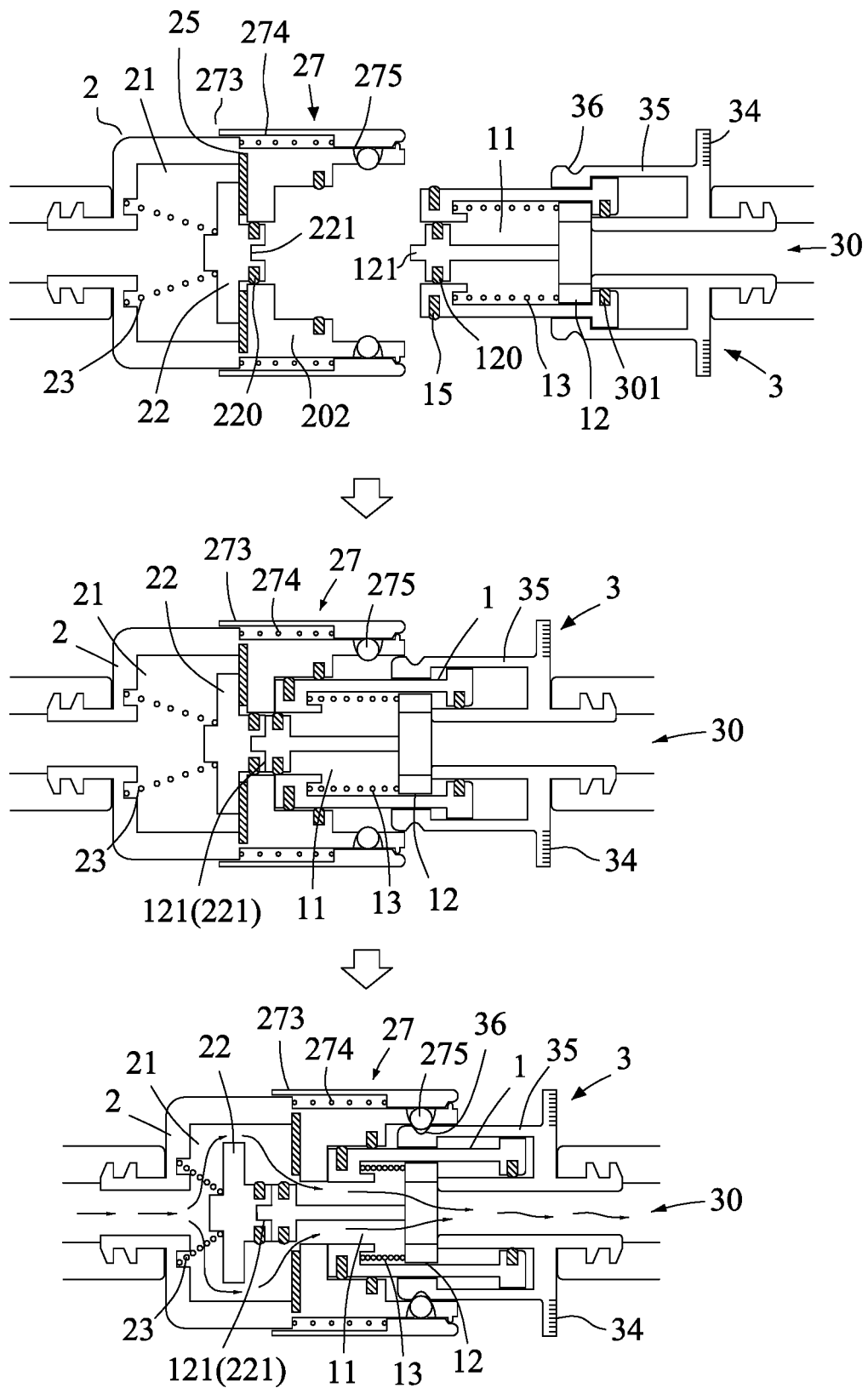
FIG. 25 is a schematic diagram of a state of use of a fluid joint structure according to a thirteenth embodiment of the present disclosure.

Referring to FIG. 24 and FIG. 25, in one embodiment of the present disclosure, a difference from the above embodiment is that, the motion unit 3 is provided with a body 35, which is located on an outer periphery of the first body 1. By abutting the body 35 against the first body 1, the motion unit 3 can be maintained to move stably.

In one embodiment of the present disclosure, the motion unit 3 is provided with a fastened portion 36. The fastened portion 36 is disposed at the body 35, and the fastening portion 27 of the second body 2 and the fastened portion 36 are fastened with each other. As such, the first joint portion 17 of the first body 1 and the second joint portion 26 of the second body 2 are enabled to join with each other, so that when the alignment portion 121 of the first joint element 12 and the corresponding alignment portion 221 of the second joint element 22 butt with each other, with the coordination of the slide sleeve 273 and the elastic body 274 of the fastening portion 27, the rollers 275 are fitted into the fastened portion 36 to form a limiting effect, thereby securely coupling the second body 2 and the body 35 of the motion unit 3. Then, the motion unit 3 pushes against the first joint element 12, and the first joint element 12 pushes against the second joint element 22 to generate the flow path of the fluid, for the fluid to flow in the first cavity 11 and the second cavity 22, further enabling the required fluid to flow stably in the first body 1 and the second body 2.

Figure 26:
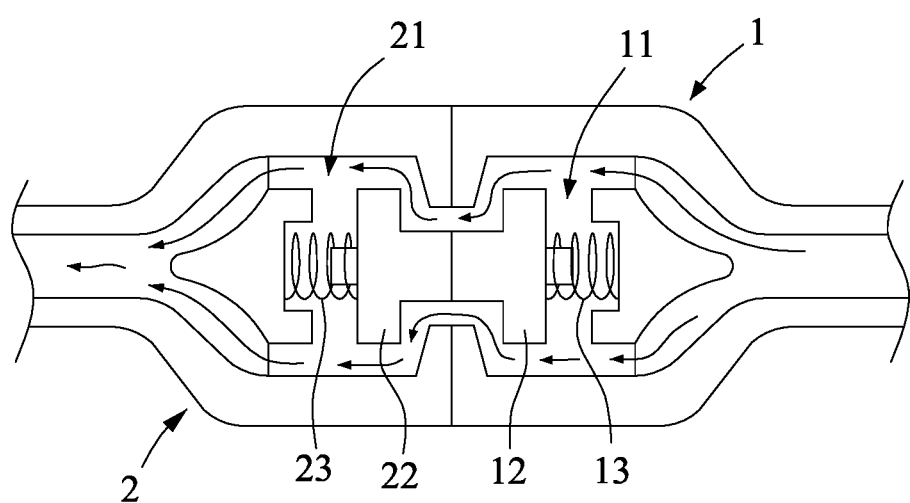
FIG. 26 is a schematic diagram of a state of use of a fluid joint structure according to a fourteenth embodiment of the present disclosure.

Referring to FIG. 26, in one embodiment of the present disclosure, different from the above embodiments, the elastic force of the first elastic element 13 is greater than that of the second elastic element 23. When the first body 1 and the second body 2 are correspondingly joined, the first joint element 12 coordinates with the first elastic element 13 to push against the second joint element 22, the second joint element 22 compresses the second elastic element 23, and the second elastic element 23 is pushed against till there is no longer any compression space (or there is a slight compression space), such that the first joint element 12 pushes against the second joint element 22 to recede so as to generate the flow path of the fluid, for the fluid to flow in the first cavity 11 and the second cavity 21, further enabling the required fluid to flow stably in the first body 1 and the second body 2.

The present invention is described by way of the preferred embodiments above. A person skilled in the art should understand that, these embodiments are merely for illustrating the present invention and are not to be construed as limitations to the scope of the present invention. It should be noted that all equivalent changes, replacements and substitutions made to the embodiments are to be encompassed within the scope of the present invention. Therefore, the scope of legal protection for the present invention should be defined by the appended claims.

What is claimed is:

1. A fluid joint structure, comprising:
   a first body, comprising a first cavity, wherein the first cavity is movably provided with a first joint element, a first elastic element is provided between the first cavity and the first joint element, and the first joint element is configured to stop a fluid in the first cavity; and
   a second body, comprising a second cavity, wherein the second cavity is movably provided with a second joint element, and the second joint element is configured to stop a fluid in the second cavity, the first joint element and the second joint element push against each other to generate a flow path of the fluid;
   wherein the first joint element has a corresponding anti-rotation portion, the second joint element has an anti-rotation portion, and the corresponding anti-rotation portion and the anti-rotation portion are configured for mutual anti-rotation.

2. A fluid joint structure, comprising:
   a first body, comprising a first cavity, wherein the first cavity is movably provided with a first joint element, a first elastic element is provided between the first cavity and the first joint element, and the first joint element is configured to stop a fluid in the first cavity; and
   a second body, comprising a second cavity, wherein the second cavity is movably provided with a second joint element, and the second joint element is configured to stop a fluid in the second cavity, the first joint element and the second joint element push against each other to generate a flow path of the fluid;
   wherein the first joint element or the second joint element has a stop portion, the second cavity or the first cavity has a corresponding stop portion, and the stop portion and the corresponding stop portion are configured for corresponding anti-rotation.

3. A fluid joint structure, comprising:
   a first body, comprising a first cavity, wherein the first cavity is movably provided with a first joint element, a first elastic element is provided between the first cavity and the first joint element, and the first joint element is configured to stop a fluid in the first cavity; and
   a second body, comprising a second cavity, wherein the second cavity is movably provided with a second joint element, and the second joint element is configured to stop a fluid in the second cavity;

wherein the fluid joint structure further includes a motion unit, the first joint element is fixedly connected with the motion unit, the first body is movably assembled between the motion unit and the first joint element, the first elastic element is provided in the first cavity, one end of the first elastic element pushes against the first joint element and the other end of the first elastic element pushes against the other side of the first body; when the first body and the second body are joined, the first body is pushed by the second body and into the motion unit; simultaneously, the first joint element is pushed against the second joint element to move to generate a flow path of a fluid, for the fluid to flow in the first cavity and the second cavity.

* * * * *